United States Patent [19]

Nakano et al.

[11] Patent Number: 5,708,787
[45] Date of Patent: Jan. 13, 1998

[54] MENU DISPLAY DEVICE

[75] Inventors: Yoshio Nakano, Takatsuki; Hidekazu Tanigawa, Hirakata; Kiyokazu Yamanaka, Ashiya, all of Japan

[73] Assignee: Matsushita Electric Industrial, Osaka, Japan

[21] Appl. No.: 654,335

[22] Filed: May 28, 1996

[30] Foreign Application Priority Data

May 29, 1995 [JP] Japan ................. 7-130183

[51] Int. Cl.$^6$ ................. G06F 15/00
[52] U.S. Cl. ................. 395/352; 395/348; 395/349; 395/353
[58] Field of Search ................. 395/335, 348, 395/349, 350, 351, 352, 353, 354, 356, 357

[56] References Cited

U.S. PATENT DOCUMENTS

| | | | |
|---|---|---|---|
| 4,873,623 | 10/1989 | Lane et al. | 364/188 |
| 4,951,190 | 8/1990 | Lane et al. | 364/188 |
| 5,041,967 | 8/1991 | Ephrat et al. | 364/200 |
| 5,124,942 | 6/1992 | Nielsen et al. | 395/100 |
| 5,263,174 | 11/1993 | Layman | 395/800 |
| 5,367,626 | 11/1994 | Morioka et al. | 395/159 |
| 5,416,901 | 5/1995 | Torres | 395/159 |
| 5,430,839 | 7/1995 | Jagannathan et al. | 395/159 |
| 5,491,795 | 2/1996 | Beaudet et al. | 395/159 |
| 5,500,929 | 3/1996 | Dickinson | 395/160 |
| 5,557,722 | 9/1996 | DeRoce et al. | 395/148 |

FOREIGN PATENT DOCUMENTS

| | | |
|---|---|---|
| 61-62128 | 3/1986 | Japan . |
| 3233620 | 10/1991 | Japan . |
| 6342358 | 12/1994 | Japan . |

*Primary Examiner*—Mark R. Powell
*Assistant Examiner*—Huynh Ba
*Attorney, Agent, or Firm*—Price, Gess & Ubell

[57] ABSTRACT

A menu display device for indicating a relationship between a series of linked menu items that are listed in separate menus and displayed sequentially on a display screen to be selected by a cursor is disclosed. The plurality of menus are appropriately stored, and each menu item has a design for identifying their respective menu items. The menu items are connected so as to form a linked structure of the menus, and the linkage is also stored. A menu item display control unit is provided for retrieving the next menu, which is related to a selected menu item and for having that retrieved menu displayed by the display screen. A marker design generation unit can generate a new design, which includes at least a portion of the design for the menu item that was selected in the previous menu to thereby indicate, by the appearance of the cursor, a path through the linked menus.

12 Claims, 20 Drawing Sheets

MENU DISPLAY DEVICE

BACKGROUND OF THE INVENTION

1. Field of the Invention

The present invention relates to a menu display device which is to be installed in computers and domestic appliances that use display screens and which is used for the selection and setting of appliance functions by a user and for displaying menu items for selected data.

2. Background of the Invention

A first example of a conventional menu display device is the basic editor for IB/note manufactured by Personal Media Co., Ltd. This basic editor changes the displayed shape of the cursor in a drawing tool. In such a drawing tool, the tool panel of the basic editor includes a palette (paint, line draw, line type, corner attributes), resources (pencil, eraser, paintbrush, airbrush, paint, craft knife), and templates (free curve, straight line, rectangle, polygon, oval, sector, segment, arc) as shown in FIGS. 1A and 1B. When the pointer (cursor) is above the tool panel, it is displayed as a hand with a pointing finger. However, when the cursor is on the drawing paper (not illustrated), it is displayed as a cross. Here, when the user selects, for example, the pencil out of the available resources, the pencil icon in the tool panel is surrounded by a square to highlight that this resource is currently selected and the shape of the pointer displayed on the drawing paper changes to a pencil. Similarly, when the eraser is selected as shown in FIG. 1C, the eraser icon in the tool panel is surrounded by a square to highlight that this resource is currently selected and the shape of the pointer displayed on the drawing paper changes to an eraser (displayed as a square). Here, as shown in FIG. 1D, the width of the eraser can be selected as one of four sizes, so that the pointer on the drawing paper changes to a square which reflects the selected size.

A second example of a conventional menu display device is the selection display method disclosed by Japanese Laid-Open Patent Application No. 6-61061. For this technique, when displaying a submenu selected as an arbitrary item out of a displayed plurality of items in a main menu, the selected item of the main menu is displayed so as to distinguish it from the other items in the main menu. The submenu is displayed slightly displaced from this position so as to overlap the main menu without concealing the selected item in the main menu. By doing so, the user can still verify which item in the original main menu was selected to give the display of the present submenu, even after the display of the present submenu has begun.

In recent years, there has been a great increase in the exchange of information by servers on the Internet WWW (World Wide Web). An example of a technique for displaying such information is the browser developed by NETSCAPE INC. When the using the browser developed by NETSCAPE INC., the user can achieve a display of other data (pages) which are related to a present page by making an indication using link text ("hot spots") which is related to other pages.

Here, the object of changing the pointer shape in the first conventional device is to improve the user-friendliness of a drawing operation. When a user makes his/her operations using a mouse, it becomes necessary to make use of a great variety of functions using only the limited combinations of moving the pointer and pressing/releasing the mouse button. This creates conflict between the user's operation indications. Accordingly, it is conventional practice to introduce the conception of "operation modes" in order to solve the problems caused by such conflict. As one example, it is well-known technique in the field of computers to equip keyboards designed for alpha-numeric input with the ability to switch between alpha-numeric mode and Japanese kana mode to allow the input of both kinds of characters. By using different operation modes in this way, limited input hardware can be used to control a great variety of operations, although as a downside it becomes necessary to inform the user of a present operation mode to prevent the user from making an erroneous input. This present operation mode can be displayed using LEDs, by displaying text on the screen, or by changing the cursor shape as in the first conventional device described above. For devices constructed in the same way as IB/note, since a pointer of a fixed shape is used to clearly show "Menu item selection" mode when making a menu item selection operation, it is not possible to inform the user of the selection history of menu items, which is to say, which menu items have been previously been selected one after the other for the case when linked items have been successively selected.

While for the second conventional device, the selection history of menu items is clearly displayed, this display of selection history reduces the available screen area and makes the screen complicated, reducing the user's ability to visually comprehend the selection operation. Also when the user wishes to know the selection history, it is necessary for the user to take his/her eyes off the current selection operation where the pointer is situated and to look at a part of the screen situated at some distance from the present position. Therefore, in order to reach a desired menu item which is located at the end of a linked construction, it is necessary for the user to successively make selections out of the displayed contents of menu items which are presently being displayed, meaning that the user may still be forced to find his/her way through the menus using trial and error, even after having performed the operation two or more times.

Also, the browser developed by NETSCAPE INC. has the drawback in that when moving to a selected page, it will only display the related data which has been selected, so that it does not clearly display the route taken by the user in reaching the data currently being displayed. Accordingly, the user has to make efforts in order to learn what data was previously displayed.

SUMMARY OF THE INVENTION

In view of the problems described above, the first object of the present invention is to provide a menu display device with improved menu item selection operation for menus of hierarchical structure.

A further object of the present invention is to provide a menu display device which enables the user to understand at a glance a selection history of menu items on the route to the data currently being displayed.

This object can be achieved by a menu display device with a function for indicating a menu item in a menu displayed on a display screen and for displaying a next menu on a display screen in order to select an operation content, the menu display device comprising: a storage unit for storing a plurality of menus, wherein each menu includes at least one menu item and a design for identifying a menu item, wherein there are connections between menu items so as to form a linked structure of the menus and wherein the storage unit additionally stores the linked structure and a design for each menu item; a selection operation unit for receiving a selection of a menu item which is made by moving a pointer on the display screen; a menu item display control unit for retrieving a next menu which is related to the selected menu item and for having the retrieved menu displayed by the display screen; a marker design generation unit for generating a new design which includes at least part of a design read from the storage means for a menu item in a previous menu which is related to the menu item displayed by the display screen; and a marker design display control unit for having the new design generated by the marker design generation unit displayed by the display screen as the pointer for the selection operation unit.

By means of the above construction, when menus have a linked structure, a design which enables the identification of the menu item in the previous menu whose selection brought about the display of the present menu items is used as the pointer. Accordingly, if the user can remember the design of the pointer, the user can quickly reach the desired menu the next time he/she makes the selection operation, which reduces the risk of the user having to find his/her desired menu item through trial and error. Furthermore, when the display switches between menus, the display informs the user of the parent menu item whose selection gave the present display of menu items, which again reduces the time wasted by the user searching through the menus using trial and error.

Also, each design stored by the storage unit may suggest a content of a corresponding menu item.

By means of the above construction, when menus have a linked structure, a design which visually suggests the menu item in a previous menu whose selection brought about the display of the present menu items is used as the pointer. Accordingly, if the user can remember the design of the pointer, the user can quickly reach the desired menu the next time he/she makes the selection operation, which reduces the risk of the user having to find his/her desired menu item through trial and error. Furthermore, when the display switches between menus, the display informs the user of the parent menu item whose selection gave the present display of menu items, which again reduces the time wasted by the user searching through the menus using trial and error.

Also, the marker design generation unit may include: a judging unit for judging whether there are a plurality of related menu items whose selection causes the menu item presently being displayed by the display screen to be displayed; and a combined marker design generation unit for generating, when the judging unit judges that there are a plurality of related menu items, a new design which includes at least part of each design of the related menu items.

By means of the above construction, when there are a plurality of related menu items whose selection causes a display of the present data, the user can quickly understand that the present menu can be reached by a selection of any of these parent menu items, allowing the user to easily access a desired menu item.

The above objects can also be achieved by a menu display device which displays on a display unit a menu including at least one menu item which has a linked structure and which is used for selecting an operation, the menu display device comprising: a selection operation unit for receiving a selection of a menu item which is made by moving a pointer on the display unit; a menu item storage unit for storing designs which enable each menu item to be distinguished from each other and which suggest a content of a corresponding menu item and auxiliary designs which resemble said designs and which are used for facilitating generation of the pointer; a menu item display control unit for retrieving from the menu item storage unit menu items in a next menu which are related to the menu item for which the selection was received and for having the retrieved menu items displayed by the display unit; an auxiliary marker design generation unit for generating a new design which includes at least part of an auxiliary design stored in the menu item storage unit; and a marker design display control unit for having the new design generated by the auxiliary marker design generation unit displayed by the display unit as the pointer for the selection operation unit.

By means of the above construction, when, for example, the designs of menus items are complicated, the use of auxiliary designs enables a simplification of the generation process of a new design as well as an improvement in the quality of the generated result.

Also, the marker design generation unit may include: a judging unit for judging whether there are a plurality of related menu items whose selection causes the menu item presently being displayed by the display unit to be displayed; and a combined auxiliary marker design generation unit for generating a new design which includes at least part of each auxiliary design for the related menu items on the next higher level, when the judging unit judges that there are a plurality of related menu items.

By means of the above construction, a new design can easily be generated through combination of auxiliary designs.

The above objects can also be achieved by a menu display device for a data display system which successively displays data which include link text that is related to other data on a display screen, the menu display device comprising: a data storage unit for storing a plurality of data, each of which includes a design which is identified by a design identifier, and links between link text included in each piece of data and other data; a selection operation unit for selecting link text in data displayed on the display screen; a data display control unit for displaying a selection operation unit for selecting link text in data displayed on the display screen, for reading data related to link text selected by the selection operation unit and for having the read data displayed by the display unit; a design identifier storage unit for successively storing a design identifier of a design included in each data displayed by the data display control unit, each time new data is displayed on the display screen; and a design display control means for retrieving, from the data storage unit, designs which correspond to each design identifier stored in the design identifier storage unit, and for displaying, in a different display region of the display screen to a data display region, the retrieved designs in an order in which each data to which the designs correspond was displayed.

By means of the above construction, since designs which were included in data which was previously displayed are displayed in a display region aside from the data display region on the display screen, the user is able to comprehend the history of the displayed data just by glancing at this region.

Also, the menu display device may further comprise a design selection reception unit for receiving a selection of a design out of a plurality of designs displayed on the display screen, wherein the data display control unit may include a history data display control unit for retrieving data which includes the design whose selection is received by the design selection reception unit and for having the retrieved data displayed on the display unit.

By means of the above construction, the user is able to easily access data which was previously viewed without having to make a complex operation.

BRIEF DESCRIPTION OF THE DRAWINGS

These and other objects, advantages and features of the invention will become apparent from the following description taken in conjunction with the accompanying drawings which illustrate a specific embodiment of the invention. In the drawings.

DESCRIPTION OF THE PREFERRED EMBODIMENTS

The following is a description of the embodiments of the present invention.

First Embodiment

Figure 1A:
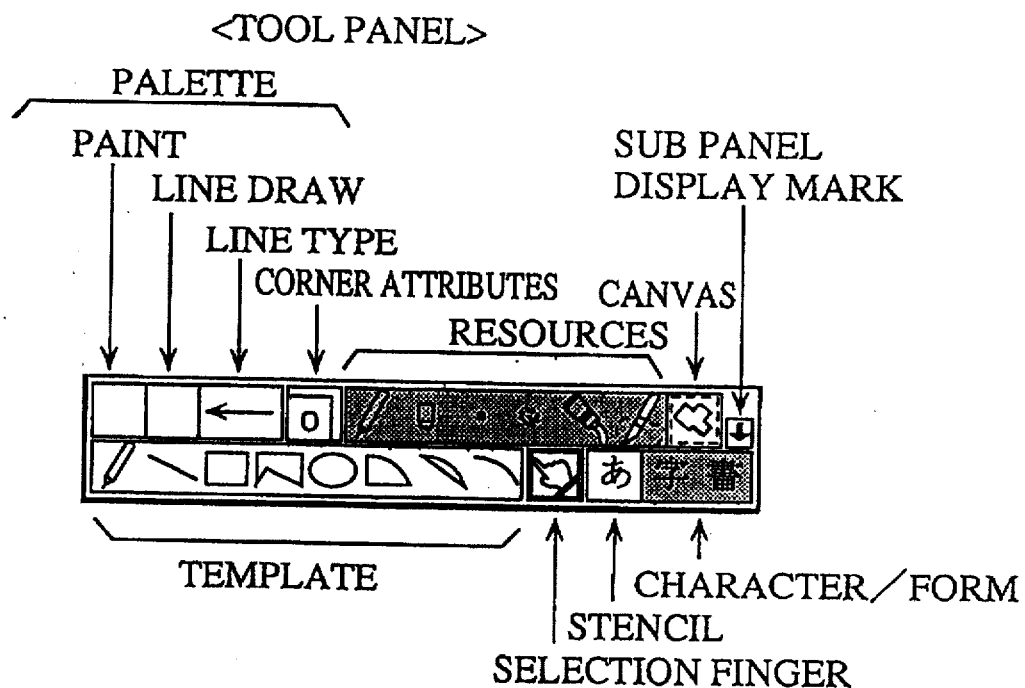
FIGS. 1A through 1D are drawings for explaining the prior art.
Figure 1B:
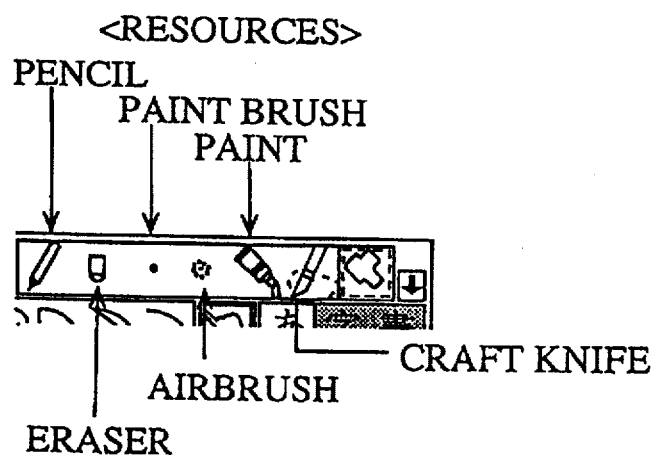
Figure 1C:
Figure 1D:
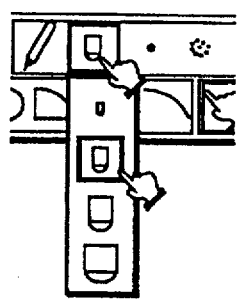
Figure 2:
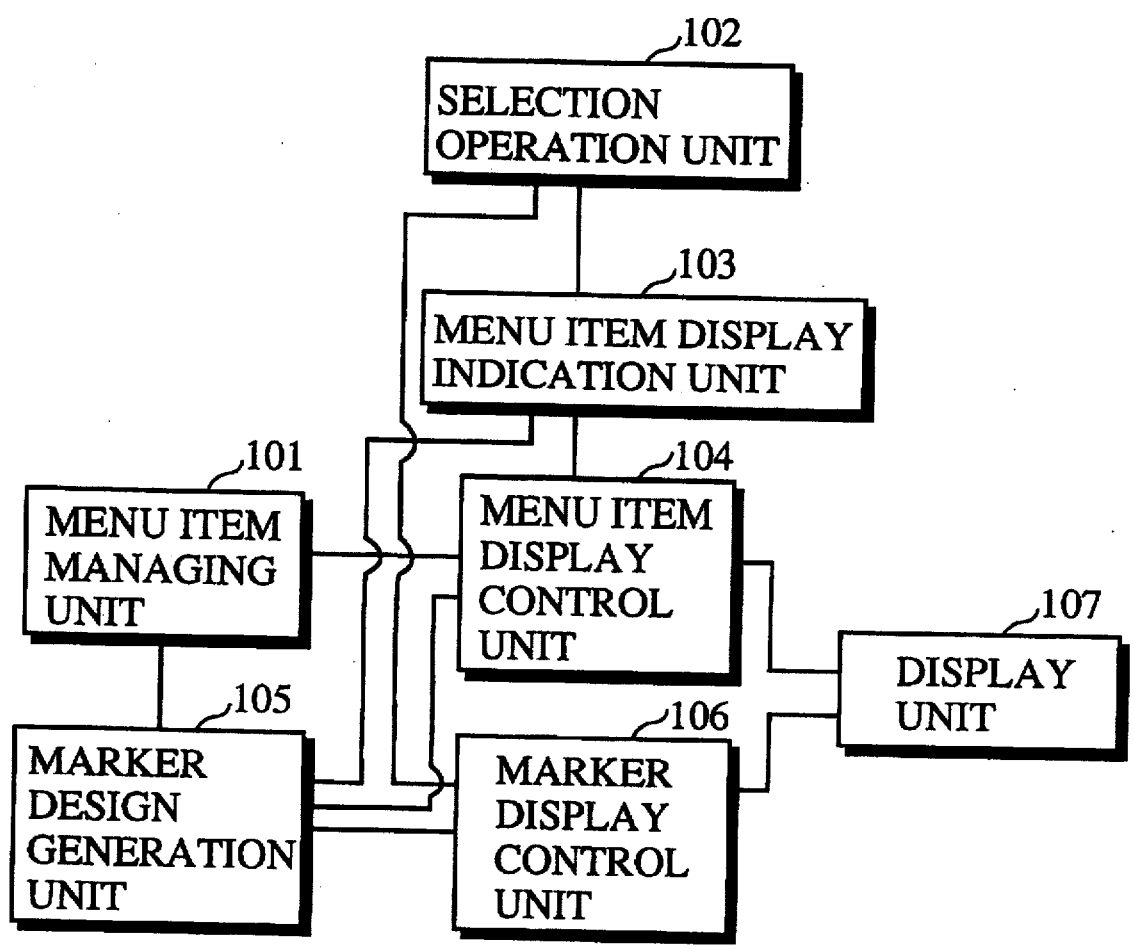
FIG. 2 shows the construction of the menu display device of the first embodiment of the present invention.

FIG. 2 shows the construction of the menu display device of the first embodiment of the present invention. This menu display device is made up of menu item managing unit 101, selection operation unit 102 which can be composed of four directional cursor keys (up, down, left and right), a mouse, a trackball or a joystick, menu item display indication unit 103, menu item display control unit 104, marker design generation unit 105, marker display control unit 106, and display unit 107 which is composed of a bit map display, such as a liquid crystal display, a CRT or the like.

Figure 3:
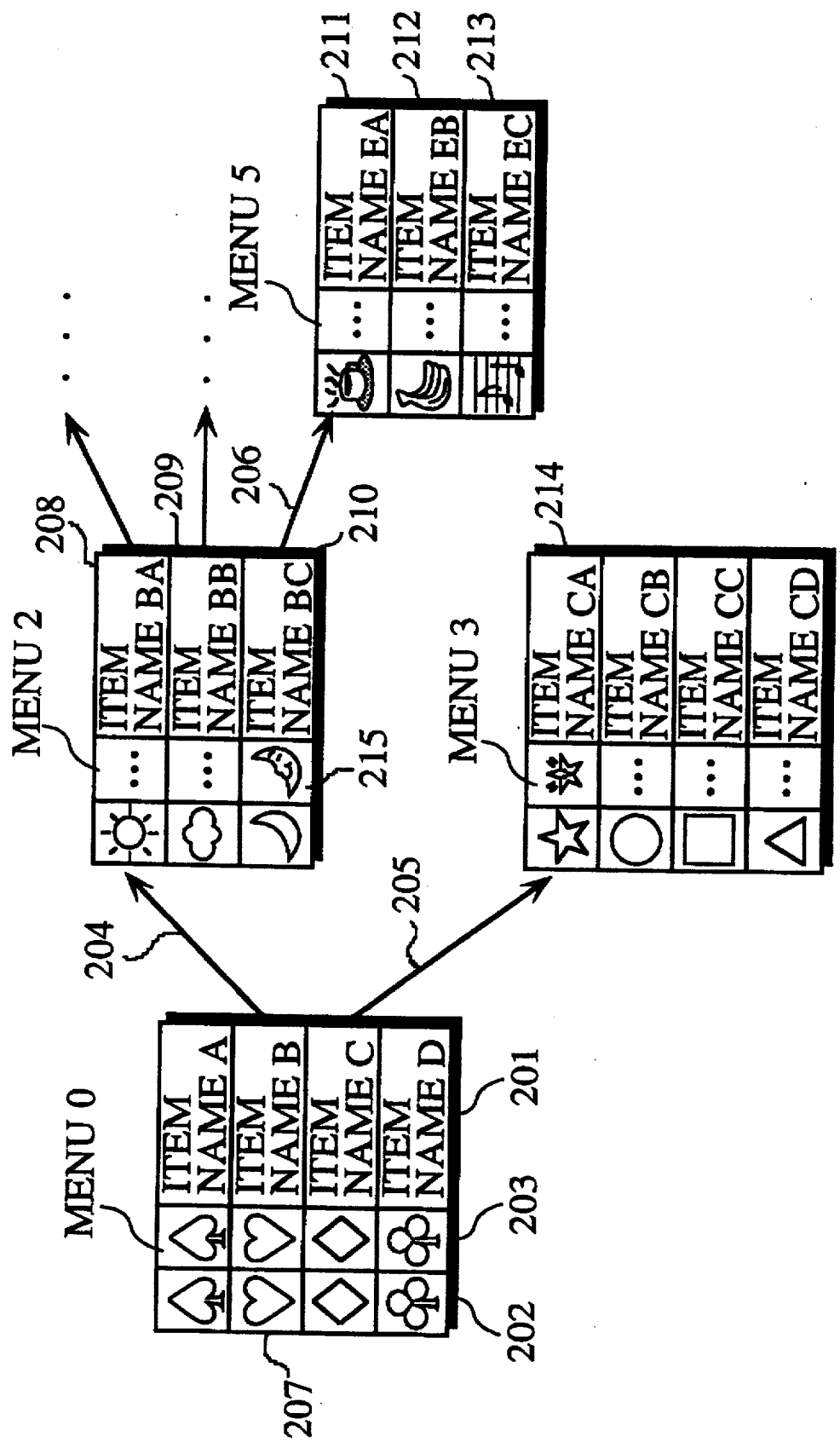
FIG. 3 shows the content of an example composition 1 of the menu items stored by the menu item managing unit.

Menu item managing unit 101 stores menus as shown in FIG. 3. In this example, menu 0 is the highest menu in the hierarchy, with the names of the each of the items which show item contents being shown in column 201, a design for suggesting the item content to the user and for distinguishing each menu item from the others being shown in column 202, and an auxiliary design referenced by marker design generation unit 105 (explained below) being shown in column 203. Here, relations between a menu item and higher or lower levels in the hierarchy are shown by arrows 205, 204 in FIG. 3. As one example, menu item B 207 in menu 0 has a lower level which includes menu items BA (shown using reference numeral 208), BB (209) and BC (210). Subsequently, menu item BC 210 has a lower level which includes menu items EA (211), EB (212) and EC (213). It should be noted here that each menu item is displayed by display unit 107 as having a design or graphic symbols in design column 202 which characterizes the corresponding menu item and a character string shown in the item name column 201 which expresses item content. When there are a plurality of menu items, the menu items are displayed as being vertically aligned. Also, a display area is provided to the left of each menu item for displaying the marker design that shows which menu item is currently being selected.

Here, the designs stored in the auxiliary design column 203 are identical or at least similar to the designs stored in the design column 202 which are included in the menu items. As examples, the designs are the same in columns 202 and 203 for menu entry 207 of menu 0 of the present figure, while the designs are similar in menu entry 210 in menu 2 or in menu entry 214 in menu 3. Here, explanation of the auxiliary design column for other menu items has been omitted.

Here, the designs stored in the auxiliary design column 203 are set so as to facilitate the combining of a plurality of designs by the marker design generation unit 105 (explained below). These auxiliary designs include designs which are reduced shortened or decorated versions of the designs in column 202.

Selection operation unit 102 indicates an activation of menu item display indication unit 103 on receiving an user indication for menu display. Also, on receiving a cursor movement operation by the user, it detects the coordinates of the new cursor position and informs marker display control unit 106 of these coordinates. On receiving a menu item selection indication from the user, selection operation unit 102 informs menu item display indication unit 103 of the coordinates of the cursor position and the selection indication.

It should be noted here that the design of the cursor being displayed by display unit 107 can be replaced with a marker design generated by marker design generation unit 105 according to control by marker display control unit 106 (explained below).

On receiving an activation indication from selection operation unit 102, menu item display indication unit 103 indicates a display of the menu items in the highest menu to menu item display control unit 104, as well as indicating to marker design generation unit 105 to read the marker design corresponding to the menu items in the highest menu. On receiving coordinates of the cursor position and a selection indication from selection operation unit 102, menu item display indication unit 103 informs menu item display control unit 104 of the coordinates and informs marker design generation unit 105 of the selection indication.

On receiving an indication to display the highest menu from menu item display indication unit 103, menu item display control unit 104 retrieves the highest menu stored in menu item managing unit 101 and has the highest menu displayed by display unit 107 by generating bit map data for the designs in column 202 and for the menu item names in column 201. In doing so, the coordinates for the positions at which each of the menu items in the menu is displayed by display unit 107 are stored in a buffer. Also, on being informed by menu item display indication unit 103 of coordinates for a new position, menu item display control unit 104 retrieves a menu item whose display position coordinates in the buffer correspond to the coordinates for the new position. Menu item display control unit 104 then retrieves the menu items in a menu on the next lower level which are related to the retrieved menu item and has the next menu items displayed by display unit 107 by generating bit map data. Menu item display control unit 104 also informs marker design generation unit 105 of these menu items. In doing so, the coordinates of the display positions on display unit 107 of the menu items in this new menu are stored in the buffer.

Figure 4:
FIG. 4 shows an example of a predetermined marker design.

As shown in FIG. 4, marker design generation unit 105 includes a storage area which already stores marker design 301 corresponding to highest level menu items. On receiving a read indication for a marker design corresponding to a highest level menu item from menu item display indication unit 103, marker design generation unit 105 informs marker display control unit 106 of the marker design stored in the storage area. Also, on receiving a selection indication from menu item display indication unit 103 and notification of a menu item from menu item display control unit 104, marker design generation unit 105 reads the auxiliary design for the menu item on a next higher level which is related to the notified menu item from menu item managing unit 101. In doing so, when there are a plurality of such related menu items on a next higher level, marker design generation unit 105 reads the auxiliary designs for all of these related menu items and combines them, or in other words, generates a single marker design from which the original auxiliary markers can be understood. It then informs marker display control unit 106 of this marker design.

On receiving coordinates from selection operation unit 102 and notification of the marker design from marker design generation unit 105, marker display control unit 106 has the marker design received from marker design generation unit 105 displayed on display unit 107. Also, on receiving only coordinates from selection operation unit 102, marker display control unit 106 has the marker design displayed on display unit 107 moved to a position specified by the received coordinates.

Display unit 107 displays menu items according to control by menu item display control unit 104 at the same time as displaying a marker design according to control by marker display control unit 106.

Figure 5:
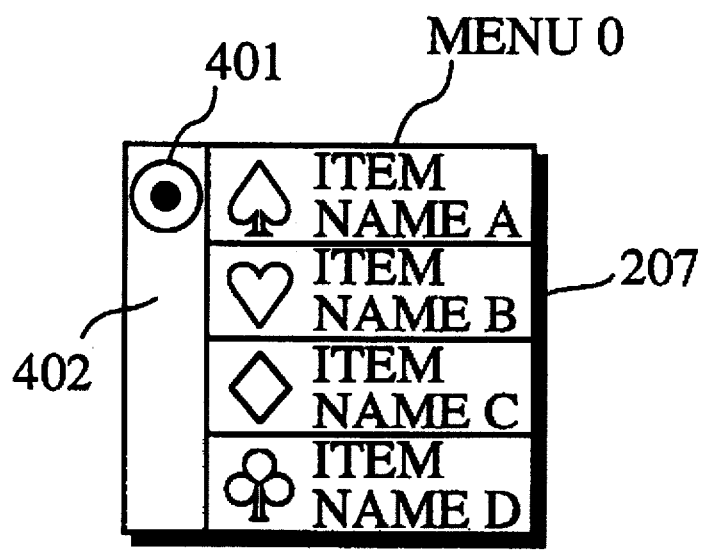
FIG. 5 shows an example display of menu 0.

More specifically, when the menu items on different levels shown in FIG. 3 are stored in menu item managing unit 101 and selection operation unit 102 is given a user indication for menu display, the window in display unit 107 displays the highest menu as shown in FIG. 5. At this point, design 401 is marker design 301, which is prepared beforehand for this highest menu and which is stored in the storage area of marker design generation unit 105.

Figure 6:
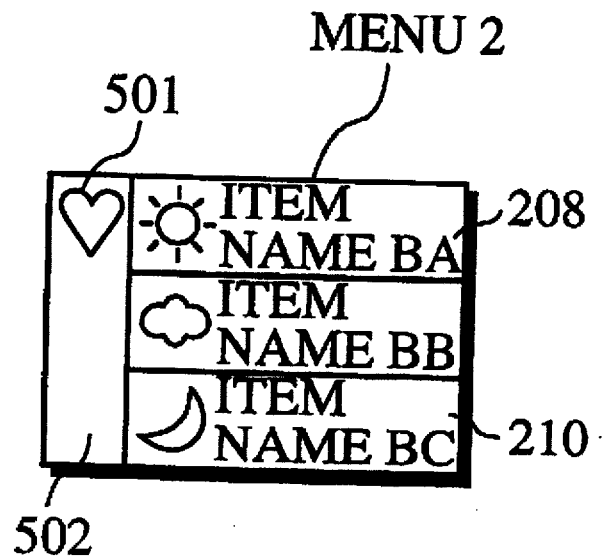
FIG. 6 shows an example display of menu 2.
Figure 7:
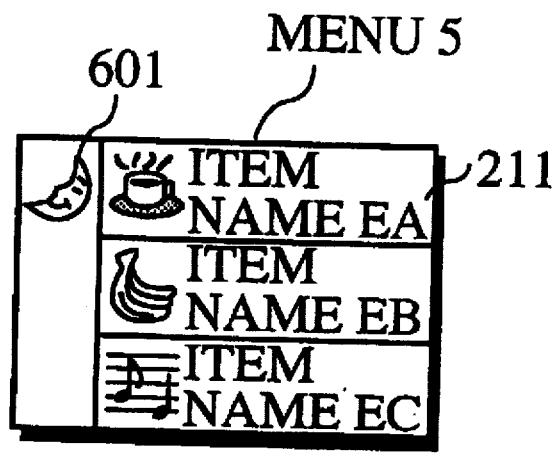
FIG. 7 shows an example display of menu 5 based on the example composition 1 of menu items in FIG. 3.

The user then moves the marker 401 by operating selection operation unit 102 (for example, by pressing the down cursor key) to position 402 corresponding to menu item 207 and gives a selection indication, so that the window of display unit 107 displays menu 2 on the next lower level as shown in FIG. 6. In this figure, marker design 501 is displayed at a position corresponding to menu item 208. Here, the shape of marker design 501 shows that the menu item on a next higher level above menu 2 which includes menu item 208 is menu item 207. Here, if the user moves marker 501 to position 502 corresponding to menu item 210 by operating selection operation unit 102 and gives a selection indication, the window of display unit 107 displays menu 5 on the next lower level as shown in FIG. 7.

Here, the shape of marker design 601 displayed at a position corresponding to menu item 211 shows that the menu item on a next higher level above menu item 211 is menu item 210. This shape of marker design 601 is the same as auxiliary design 215 stored in the entry for menu item 210 in the column of auxiliary designs which is stored in menu item managing unit 101.

Figure 8:
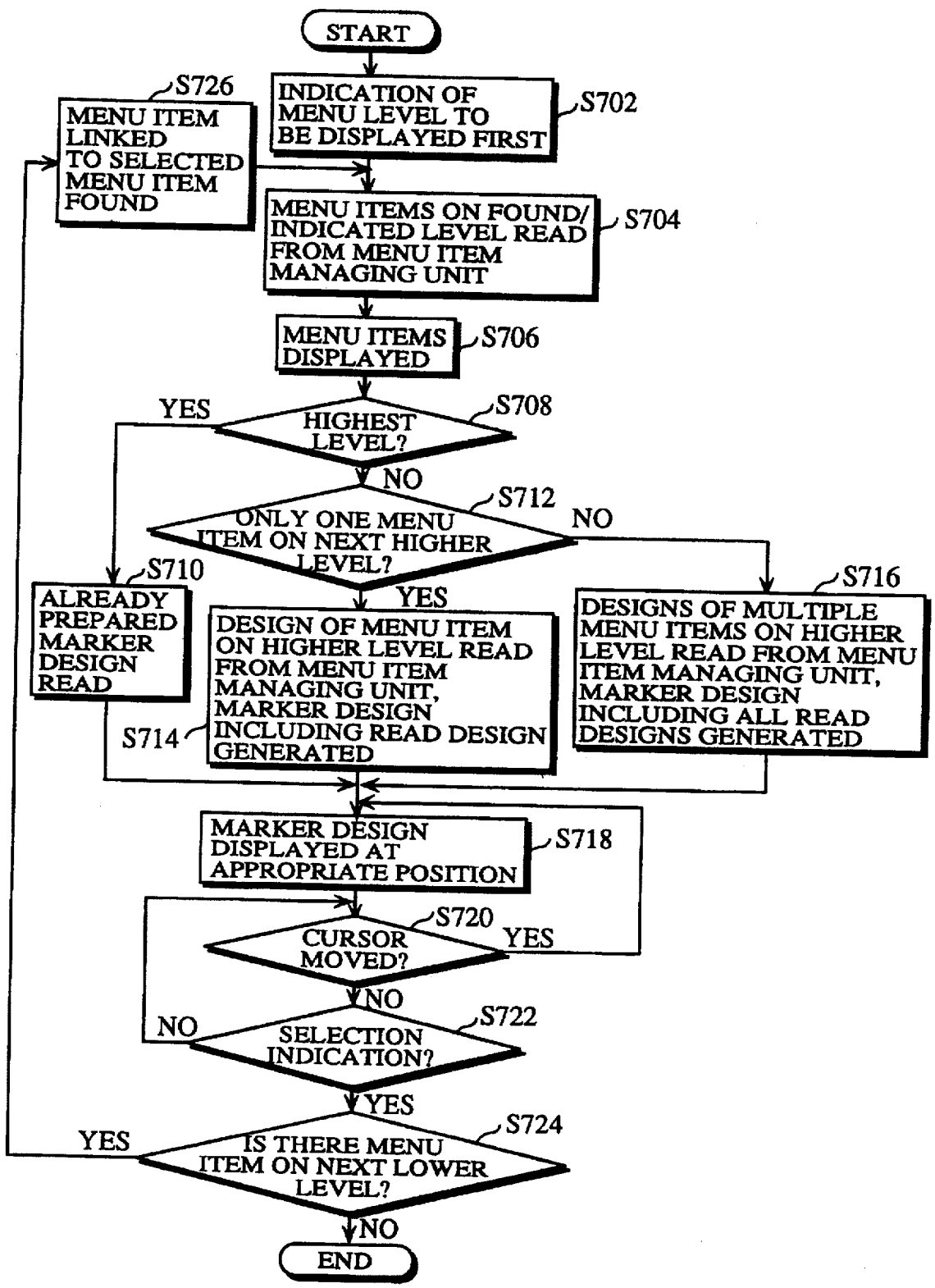
FIG. 8 is a flowchart for the operation of the above embodiment.

The following is an explanation of the operation of the present embodiment with reference to the flowchart in FIG. 8.

First, on receiving a menu display indication from the user via selection operation unit 102, menu item display indication unit 103 gives an indication to menu item display control unit 104 for a display of a highest menu (menu items) in the hierarchy (S702). Menu item display control unit 104 then reads the menu items on the indicated level from menu item managing unit 101 (S704), generates bit map data for the menu items, each of which is made up of a menu item name and a design, and has this bit map data displayed by display unit 107 (S706).

Next, marker design generation unit 105 judges whether a notified menu item is a menu item on the highest level (S708), and reads the marker which is stored beforehand in its storage area when the menu item is on the highest level (S710), before advancing to S718. When the notified menu item is not on the highest level, marker design generation unit 105 judges whether there is only one menu item on a next higher level which is related to the notified menu item (S712). When it judges that there is only one such related menu item, marker design generation unit 105 reads the auxiliary marker included in this related menu item from menu item managing unit 101, uses it to generate the marker design (S714) and advances to S718. When it judges that there are a plurality of such related menu items, marker design generation unit 105 reads the auxiliary marker included in each of these related menu items and combines every auxiliary marker to generate the marker design (S716) before advancing to S718.

In S718, marker display control unit 106 has the marker design, which was either read or generated by marker design generation unit 105, displayed at a position on display unit 107 specified by the coordinates received from selection operation unit 102. When there has been movement of the cursor, the process returns to S718, while when there has been no movement of the cursor, the process advances to S722 (S720).

In step S722, menu item display indication unit 103 judges whether there has been a menu item selection indication from selection operation unit 102, with the process returning to S720 when it judges that there has been no such indication.

When there has been a menu item selection indication, menu item display control unit 104 reads the stored content of menu item managing unit 101 and judges whether there is a menu item on a next lower level (S724). If there is no such lower level menu item, the process is terminated. However, if there is a lower level menu item (menu), the menu related to the menu item in the selection indication is found (S726) and the process returns to S704.

It should be noted here that in the present embodiment, marker design generation unit 105 is described as using the design stored in auxiliary design column 203 in generating the marker design, although it may instead use the design stored in design column 202 which is included in a menu item.

Second Embodiment

The construction of the menu display device of the second embodiment is the same as in the first embodiment.

Figure 9:
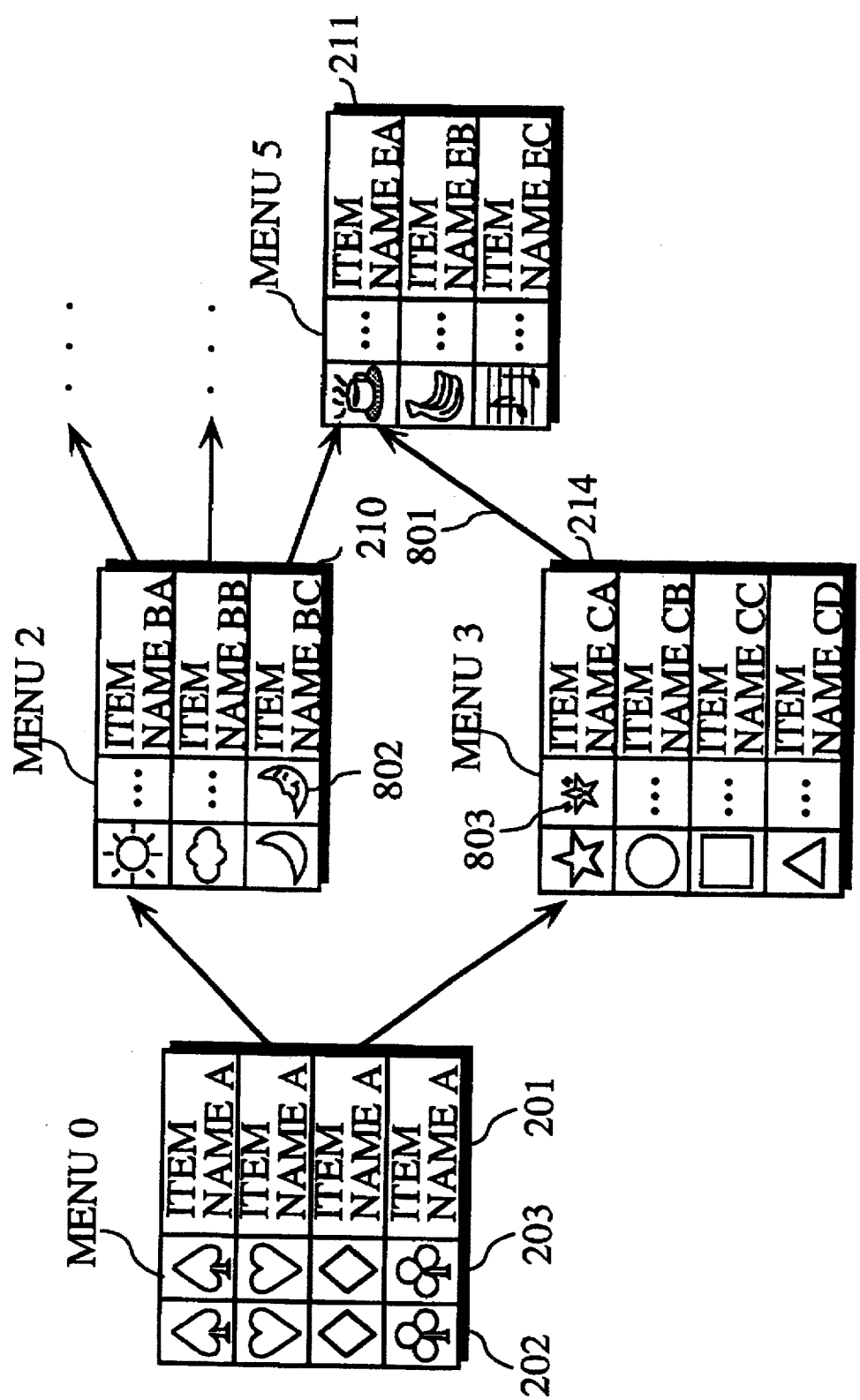
FIG. 9 shows the content of the example composition 2 of menu items stored by the menu item managing unit in the second embodiment.
Figure 10:
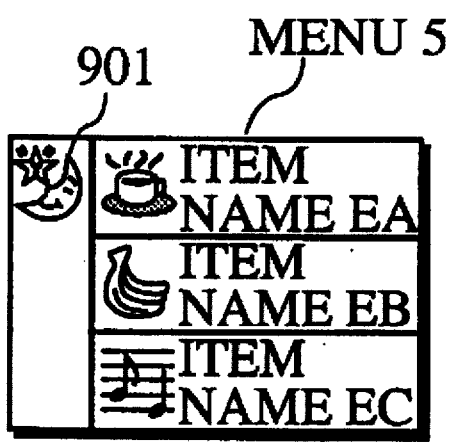
FIG. 10 shows an example display of menu 5 based on the example composition 2 of menu items shown in FIG. 9.

In the second embodiment, menu item managing unit 101 stores the menus shown in FIG. 9. These menus are different to the menus shown in FIG. 3 of the first embodiment in that menu item 214 and menu item 211 are related as shown by arrow 801. Accordingly, the menu items on a next higher level (called "parent menu items") for menu item 211 are the two menu items 210 and 214. As a result, when for example menu 2 is displayed by the window of display unit 107 as shown in FIG. 6, and marker design 501 is moved to position 502 corresponding to menu item 210 and a selection indication is made, menu 5 will be displayed by the window of display unit 107 as shown in FIG. 10. Here, marker design 901 used for selecting a menu item is a combination of auxiliary design 802 of parent menu item 210 and auxiliary design 803 of parent menu item 214. Here, combination refers to a formation of one design from which the original forms of both auxiliary designs 802, 803 can be understood. Note here that the display of this menu 5 is the same even when there has been a selection indication for menu item 214.

Third Embodiment

In this third embodiment, construction elements of the menu display device which are the same as in the first embodiment will not be described, and the explanation will focus on the differences with the first embodiment.

Figure 11:
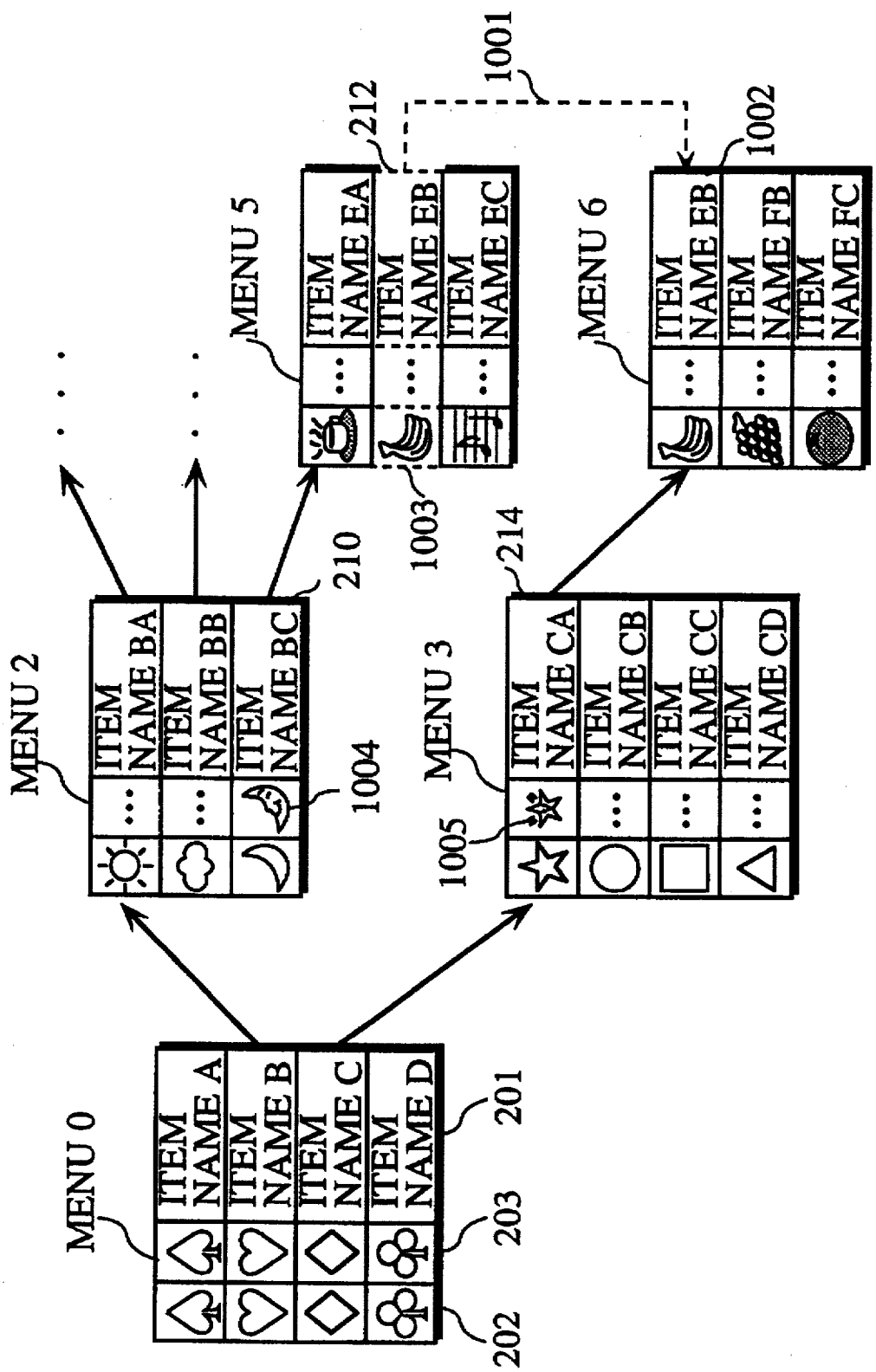
FIG. 11 shows the content of the example composition 3 of menu items stored by the menu item managing unit in the third embodiment.

In the third embodiment, menu item managing unit 101 stores the menus shown in FIG. 11. These menus are different to the menus shown in FIG. 3 of the first embodiment in that menu item 212 is related by broken line 1001 so as to refer to menu item 1002. Here, this menu item 212 is incomplete as shown by broken line 1003 in menu 5.

In this embodiment, the menu item display control unit has a function for also reading related menu items when a menu item stored in menu item managing unit 101 refers to a menu item in another menu (such as the menu related menu items joined by broken line 1001 in FIG. 11), in addition to the construction of menu item display control unit 104 in the first embodiment. The menu item display control unit then generates bit map data for the design stored in design column 202 and for the menu item name stored in menu item name column 201 and has the generated data displayed by display unit 107. In doing so, it notifies the marker design generation unit of the referred-to menu item and the coordinates for the position of the referred-to menu item on display unit 107.

The marker display control unit in this embodiment has a function for receiving coordinates from selection operation unit 102 and for informing marker design generation unit 105 of these coordinates, in addition to the functions of marker display control unit 106 in the first embodiment.

The marker design generation unit in this embodiment has a function for retrieving, on receiving coordinates from the marker display control unit and finding that the received coordinates coincide with coordinates received from the menu item display control unit, an auxiliary marker of a menu item on a next higher level from menu item managing unit 101, in addition to the functions of the marker design generation unit 105 in the first embodiment. Here, this menu item on a next higher level is related to the menu item which is received together with coordinates from the menu item display control unit. The marker design generation unit then gives this retrieved auxiliary marker to the marker display control unit as the marker design. In doing so, when there are a plurality of related menu items on the next higher level, the auxiliary markers for each related menu item are combined to give a single marker design in the same way as in the first embodiment.

Figure 12:
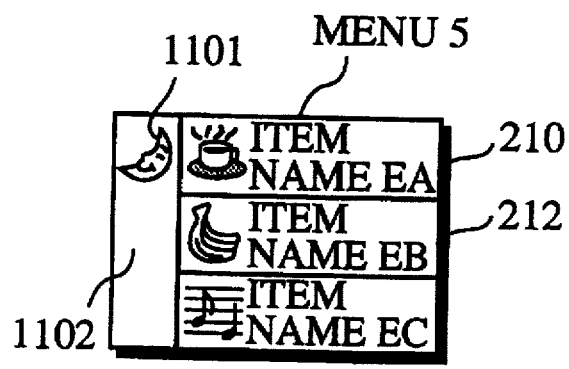
FIG. 12 is an example display of menu 5 based on the example composition 3 of menu items shown in FIG. 11.

As one example, if menu item 210 is selected when menu 2 is being displayed by display unit 107 as shown in FIG. 6, menu 5 shown in FIG. 12 will then be displayed in the window of display unit 107. At this point, marker design 1101, used for selecting a menu item, is the same as auxiliary design 1004 of menu item 210 on the next higher level.

Figure 13:
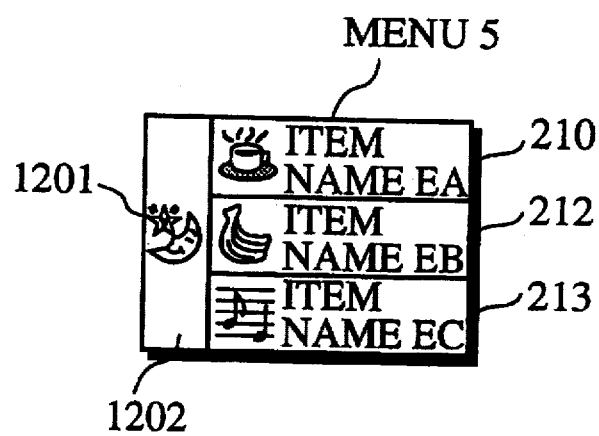
FIG. 13 is an example display of menu 5 based on the example composition 3 of menu items shown in FIG. 11.

When marker design 1101 is moved to position 1102 corresponding to menu item 212, menu 5 shown in FIG. 13 is shown in the window of display unit 107. Since menu item 212 is related as shown in FIG. 11 to menu item 1002 in menu 6, the menu items on a next higher level which are related to menu item 212 are menu item 210 and menu item 214. Accordingly, marker design 1201 in menu 5 shown in FIG. 13 is a combination of auxiliary design 1004 of menu item 210 and of auxiliary design 1005 of menu item 214.

Figure 14:
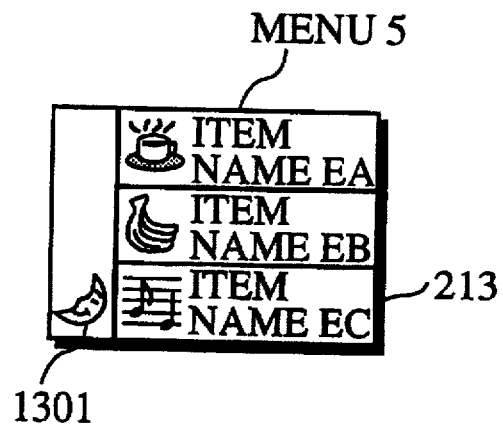
FIG. 14 is an example display of menu 5 based on the example composition 3 of menu items shown in FIG. 11.

If marker design 1201 shown in FIG. 13 is moved to position 1202 corresponding to menu item 213, menu 5 shown in FIG. 14 is displayed in the window of display unit 107.

At this point, marker design 1301 is the same as marker design 1101 in FIG. 12. This is because the only menu item on a next higher level which is related to menu item 213 is menu item 210, so that there is no relation with menu item 214.

The following is an explanation of the operation of the present embodiment, but since the operation is almost the same as the first embodiment, most steps will not be explained. The difference with the first embodiment lies in that in S720 in the flowchart of FIG. 8, the process returns to S712 and not to S718 when the marker design (cursor) has been moved.

Fourth Embodiment

In this fourth embodiment, construction elements of the menu display device which are the same as in the first embodiment will not be described, and the explanation will focus on the differences with the first embodiment.

In the present embodiment, the marker design generation unit includes a storage unit for storing a marker design which is presently being displayed, in addition to the construction of marker design generation unit 105 in the first embodiment. On receiving notification of a selection indication from menu item display indication unit 103 and receiving notification of a menu item from menu item display control unit 104, the marker design generation unit reads the auxiliary marker of a related menu item on a next higher level from menu item managing unit, combines this auxiliary marker with the marker design stored in the storage unit and notifies marker display control unit 106 of this combined marker.

Figure 15:
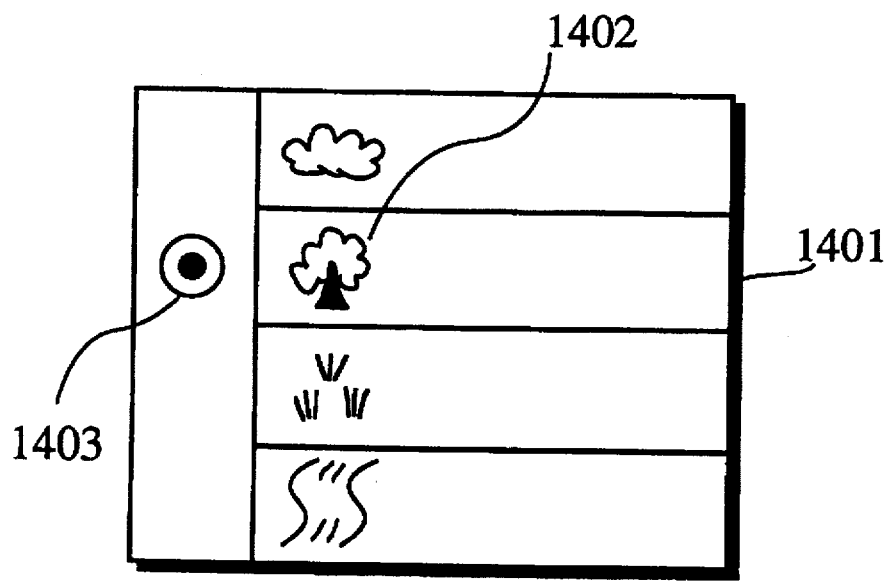
FIG. 15 is an example menu display in the fourth embodiment.
Figure 16:
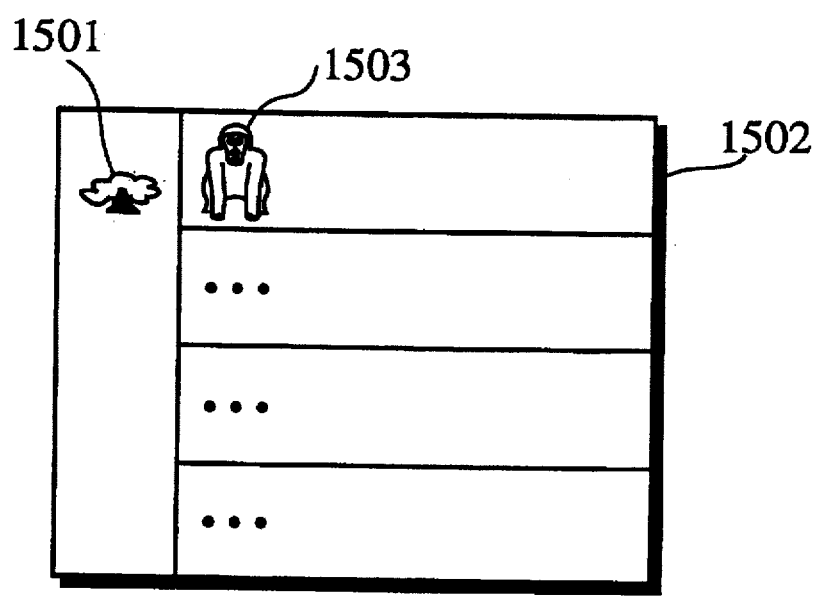
FIG. 16 is an example menu display in the same embodiment.

A specific example of the highest menu in the hierarchy which is displayed in the window of display unit 107 is shown in FIG. 15. When marker design 1403 is moved to a position next to design 1402 which signifies the content of menu item 1401 and a selection indication is made, the menu related to menu item 1401 on a next lower level is displayed in the window of display unit 107 as shown in FIG. 16. In this figure, marker design 1501 is the auxiliary marker of menu item 1401.

Figure 17:
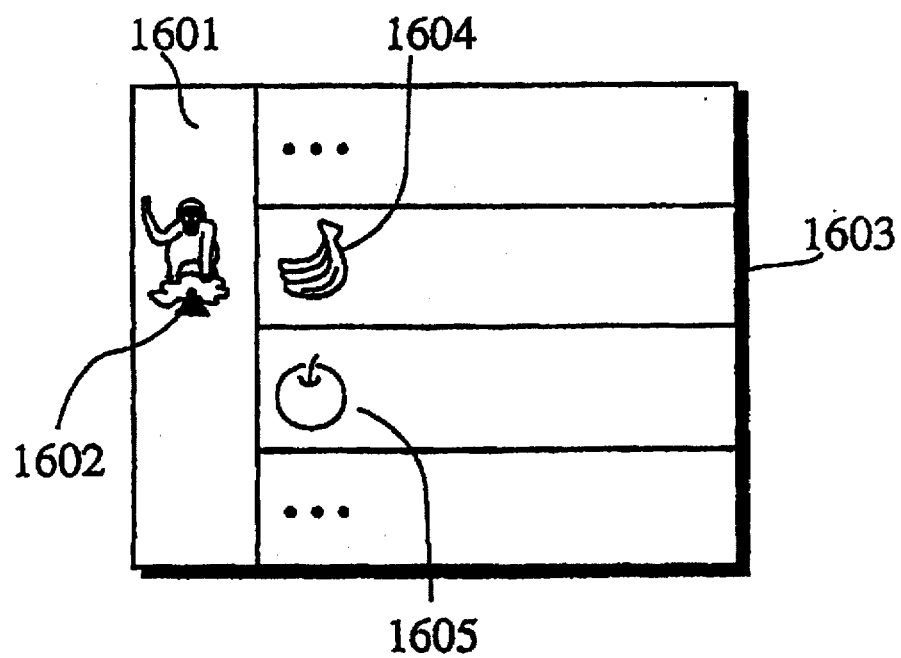
FIG. 17 is an example menu display in the same embodiment.
Figure 18:
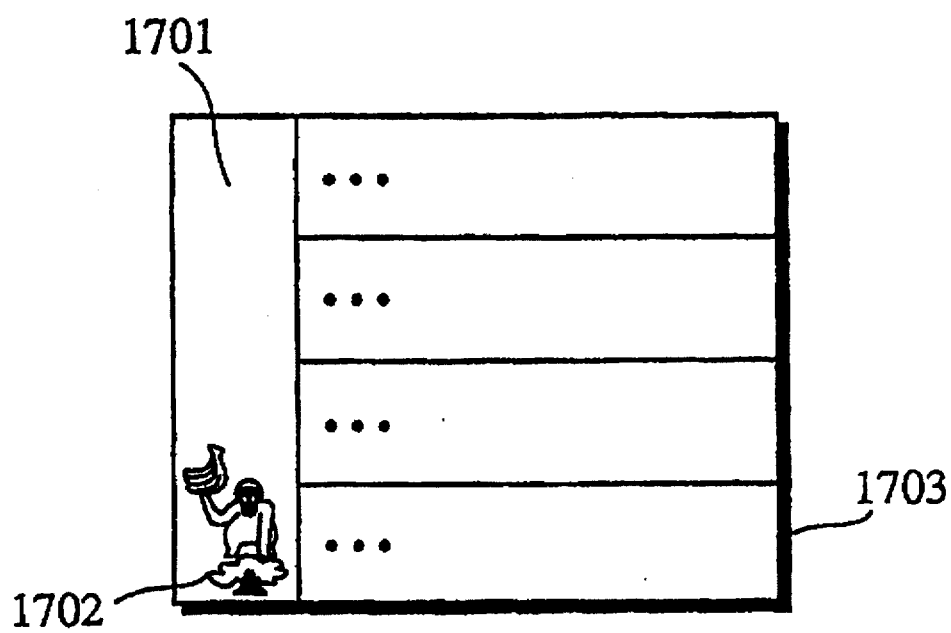
FIG. 18 is an example menu display in the same embodiment.

Here, when marker design 1501 is moved to a position next to design 1503 which signifies the content of menu item 1502 and a selection indication is made, a menu on a next lower level is displayed with marker design 1602 being shown at position 1601 as shown in FIG. 17. At this point, marker design 1602 is a combination of the auxiliary design of menu item 1502 and the auxiliary design of menu item 1402. Here, when a selection indication is given for menu item 1603, a menu on a next lower level is displayed with marker design 1702 being shown at position 1701 as shown in FIG. 18. At this point, marker design 1702 is a combination of the auxiliary design of menu design 1602 and an auxiliary design that resembles design 1604 which signifies the content of menu item 1603. By using the auxiliary markers in this way, marker designs can be easily combined. Finally, it should be noted here that the menu design for the menu item on the highest level need not be included.

Here, the user can quickly learn the design which signifies the menu items on higher levels which are related to menu item 1703 by simply looking at marker design 1702, which is to say that the user can comprehend the content of menu items simply by glancing at the marker design.

It should be noted here that it is not necessary for the designs of the menu items on a higher level to suggest the designs of menu items on a lower level, so that the designs of menu items may simply be used for leading the way to the lower level. This is to say, while the gorilla of design 1503 has a clear effect on marker design 1702 on the lowest level, it can hardly be said to suggest the apple of design 1605. However, the gorilla of design 1503 can be foreseen from the tree of design 1402.

Also, in the present embodiment, as in the first to fourth embodiments, the menu names included in the menu items have been omitted in some of the drawings. Here, if the menu item can be understood from design 1402 which suggests the menu item, the display of the menu name can be omitted.

Fifth Embodiment

Figure 19:
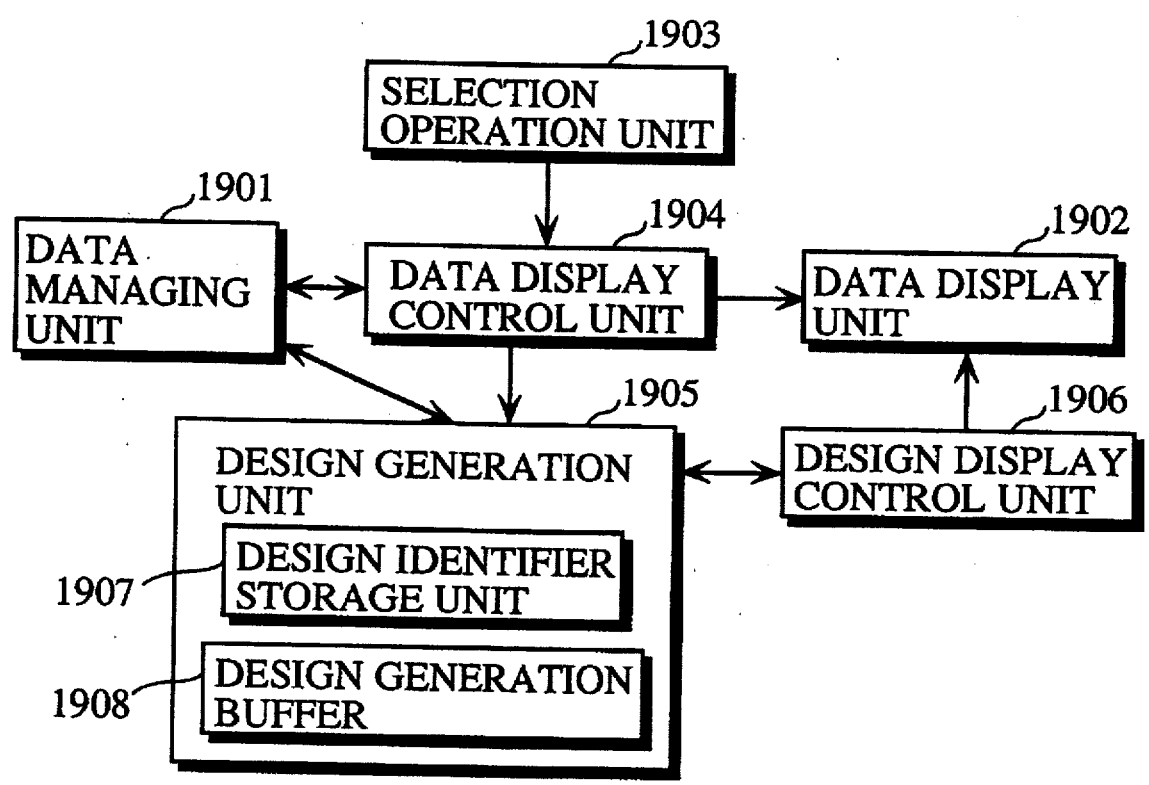
FIG. 19 shows the construction of the menu display device of the fifth embodiment of the present invention.
Figure 20:
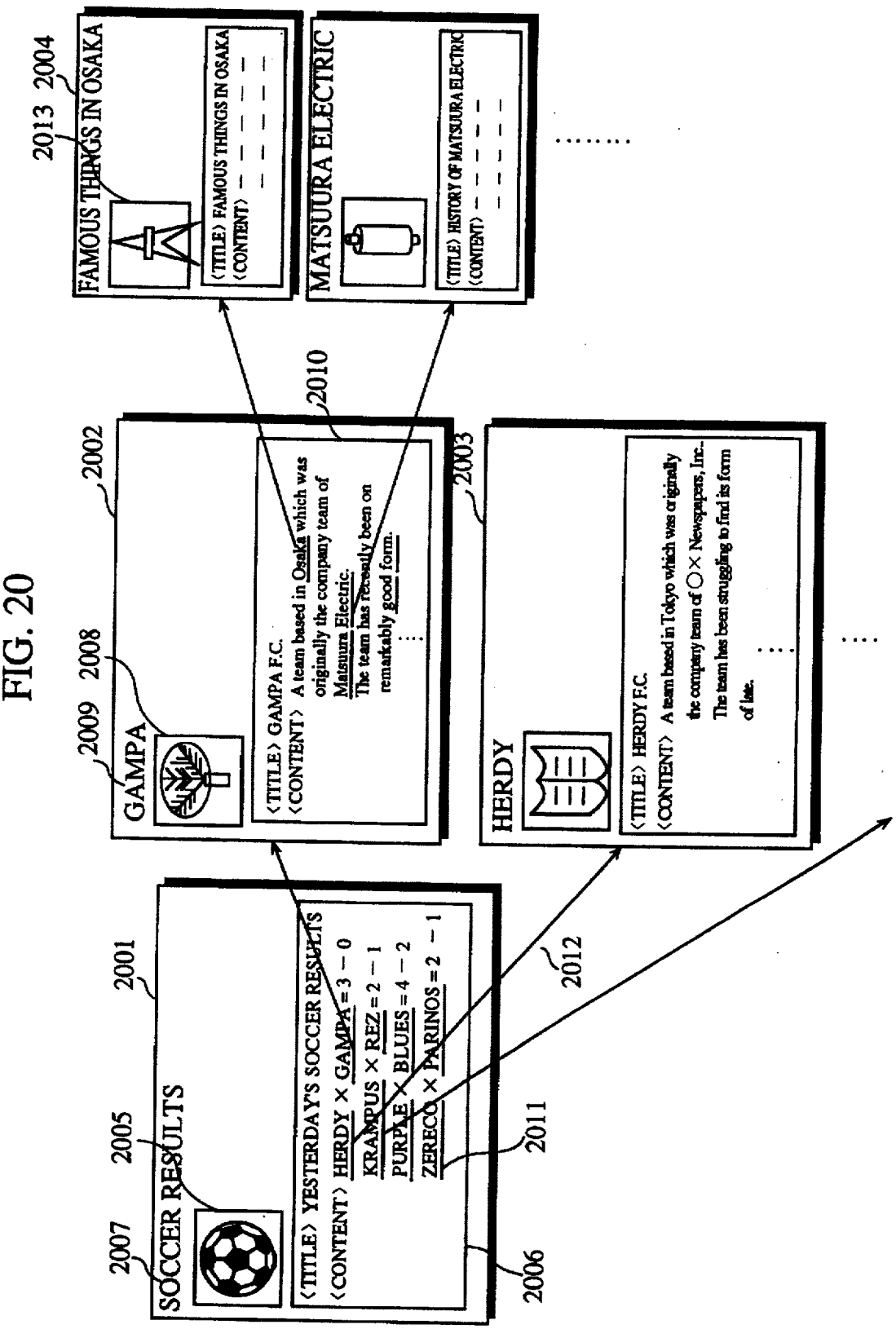
FIG. 20 is an example of the stored content of the data managing unit in the fifth embodiment.

FIG. 19 shows the construction of the menu display device of the fifth embodiment of the present invention. This menu display device is made up of data managing unit 1901, data display unit 1902, selection operation unit 1903, data display control unit 1904, design generation unit 1905 and design display control unit 1906. Here, design generation unit 1905 includes design identifier storage unit 1907 and design generation buffer 1908.

Data managing unit 1901 stores design-appended data such as 2001, 2002, 2003 and 2004. Design-appended data 2001 includes design 2005 and data 2006, with design 2005 being appended with design identifier 2007. In the same way, design-appended data 2002 includes design 2008, design identifier 2009 and data 2010. Here, data managing unit 1901 stores link relations between link text 2011 (text which is underlined) included in the data such as in data 2006 and the design-appended data, as shown by the arrows such as arrow 2012.

Figure 21:
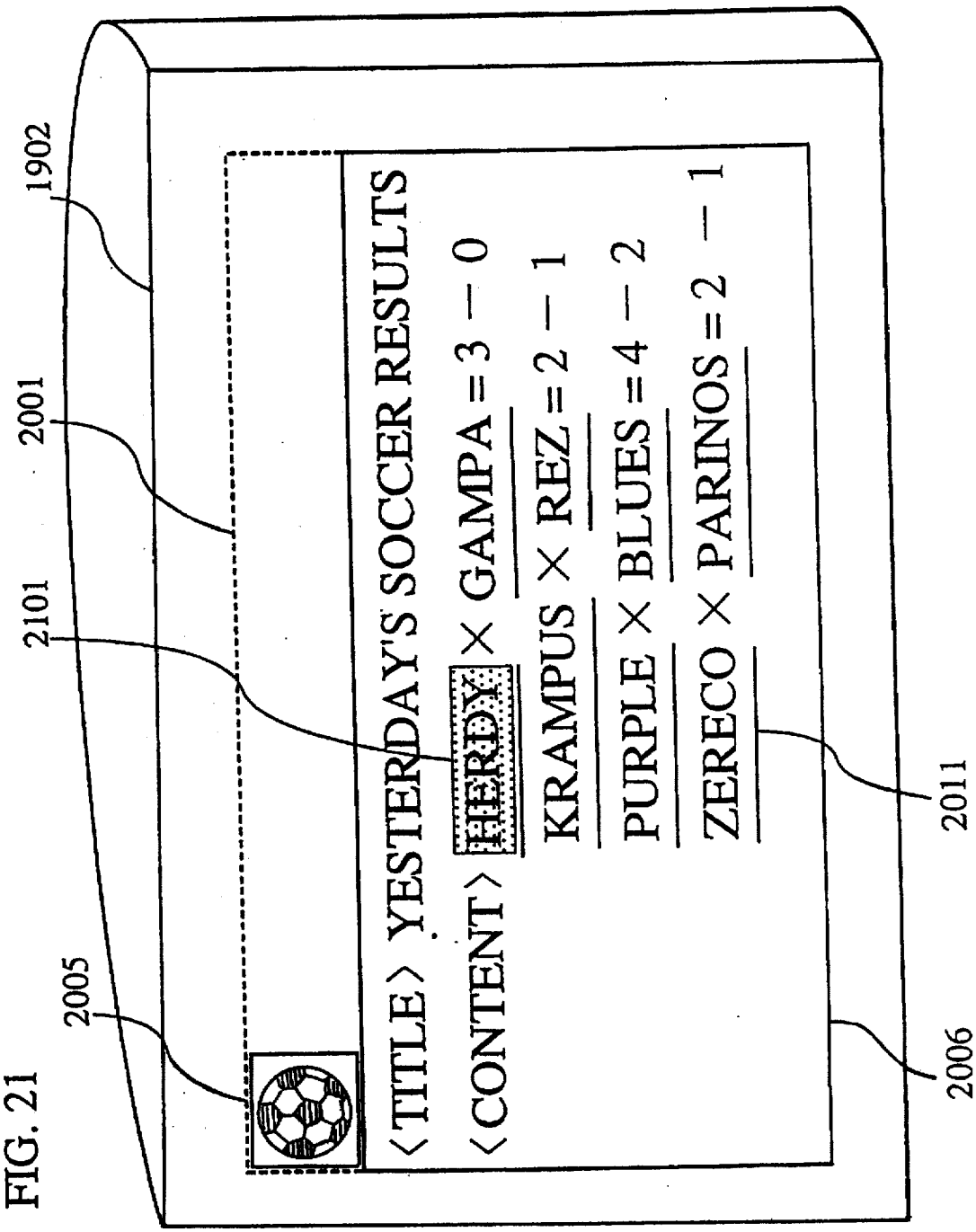
FIG. 21 is an example display of the data display unit in the fifth embodiment.

Data display unit 1902 is made up of a bit map display, such as a liquid crystal display or a CRT, and displays the data and designs in the design-appended data according to control by data display control unit 1904 and design display control unit 1906. As one example, FIG. 21 shows the case when design-appended data 2001 in data managing unit 1901 is displayed. Here, data display unit 1902 displays data 2006 and design 2005 in design-appended data 2001. As shown in the figure, design 2005, displayed at a fixed position towards the top of data 2006, is a soccer ball which signifies the content of data 2006 which is "Yesterday's Soccer Results". It should be noted here that the highlight 2101 on link text 2011 in data 2006 which indicates "Herdy" shows that the user is executing a selection operation for linked design-appended data using selection operation unit 1903 which is explained below.

Figure 22:
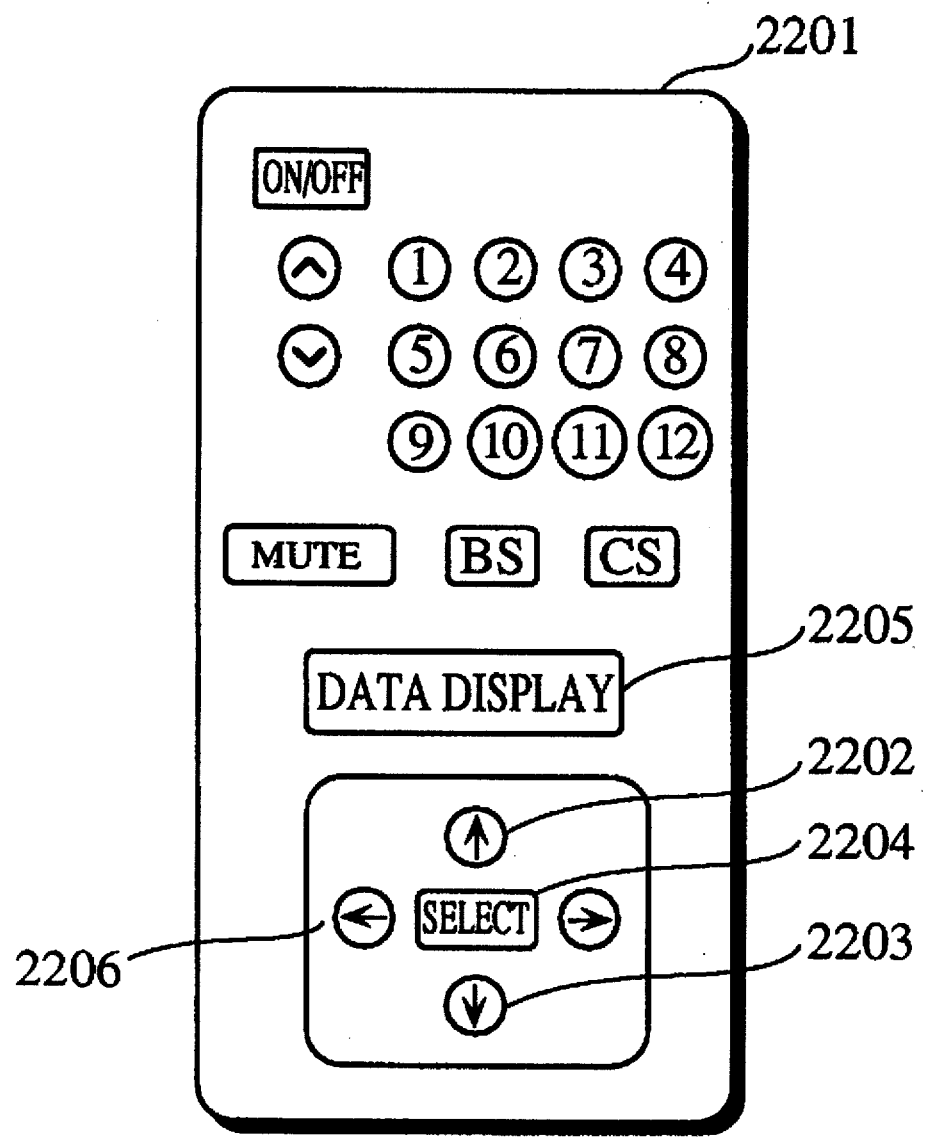
FIG. 22 shows a remote controller as one example of a selection operation unit in the fifth embodiment.

As shown in FIG. 22, selection operation unit 1903 is made up of remote controller 2201 which can be composed of four directional cursor keys (up, down, left and right), a mouse, a trackball, a joystick or the like. Selection operation unit 1903 receives a display switching indication from the user for changing the display from design-appended data 2001 in FIG. 21 and informs data display control unit 1904 of this switching indication. In other words, if the user presses "Up" button 2202 of remote controller 2201, data display control unit 1904 is informed to move one at a time to higher ranked link text in data 2006 which is presently being displayed, or if the user presses "Down" button 2203 of remote controller 2201, data display control unit 1904 is informed to move to one at a time to lower ranked link text. If the user presses "Select" key 2204, data display control unit 1904 is notified of the selection of the link text at which highlight 2101 is presently positioned.

Here, up and down in link text 2011 and the like are set so that the link text in top left position in data 2006 displayed by data display unit 1902 has the highest rank and the link text in the bottom right position has the lowest rank. In FIG. 21, "Herdy" has the highest rank while "Parinos" has the lowest rank.

It should be noted here that selection operation unit 1903 also informs data display control unit 1904 of a data display indication when data display key 2205 of remote controller 2201 is depressed.

On being informed by selection operation unit 1903 of an indication for data display, data display control unit 1904 reads the indicated design-appended data stored in data managing unit 1901 or the design-appended data for default display, such as design-appended data 2001, and, in addition to having data 2006 displayed by data display unit 1902, registers design identifier 2007 for design 2005 of design-appended data 2001 in design identifier storage unit 1907 of design generation unit 1905. Data display control unit 1904 also displays highlight 2101 on the highest-ranked position in link text 2011 in data 2006 which is displayed by data display unit 1902. On receiving an indication from selection operation unit 1903 for a move to a higher or lower ranked position in link text 2011, data display control unit 1904 displays highlight 2101 as being moved to a new position in the link text of data 2006 which is displayed by data display unit 1902 in accordance with the indication. Similarly, on receiving an indication of a selection of link text, data display control unit 1904 reads the design-appended data with is linked to the link text at which highlight 2101 is currently positioned and, in addition to having the data displayed by data display unit 1902, registers the design identifier for the design in the read design-appended data in design identifier storage unit 1907 of design generation unit 1905.

Design generation unit 1905 includes a counter N and stores the predetermined initial arrangement values (x0, y0) of a design on data display unit 1902. Once a design identifier has been registered in design identifier storage unit 1907 by data display control unit 1904, design generation unit 1905 sets counter N at "1", and substitutes the initial arrangement values (x0,y0) into the arrangement position variables (X,Y). Once the values of the arrangement position variables (X,Y) have been set, design generation unit 1905 judges whether the Nth (N being the value of the counter N) design identifier is registered in design identifier storage unit 1907, reading this design identifier when it is registered, obtaining the corresponding identifier from the design-appended data stored in data managing unit 1901, and writing this design with its top left corner position at the arrangement position in the coordinates (X,Y) in design generation buffer 1908. As one example, if the initial position values (x0, y0) are (10,10), coordinates (X,Y) will be (10,10). The value of counter N is then increased by "1", the size of the inserted design, which is width w0 by height h0, is obtained and X=X+w0 is calculated and substituted into the value of X in (X,Y). When width w0 is 30, the arrangement position variables (X,Y) are set at (40,10). Here, when the Nth design identifier is not registered in design identifier storage unit 1907, design generation unit 1905 indicates a display of designs to design display control unit 1906.

On receiving an indication to display designs from design generation unit 1905, design display control unit 1906 reads all of the designs written into design generation buffer 1908 and has data display unit 1902 display the read designs at a predetermined display position.

Design identifier storage unit 1907 is made up of RAM or the like and stores the design identifiers of every piece of design-appended data which was displayed before the design-appended data currently being displayed by data display unit 1902 in order of display, in accordance with control by data display control unit 1904.

Display generation buffer 1908 is made up of VRAM or the like and has the designs which correspond to the design identifiers stored by design identifier storage unit 1907 written in by display generation unit 1905 in accordance with the arrangement position variables (X,Y) which correspond to the display position on data display means 1902.

Figure 23:
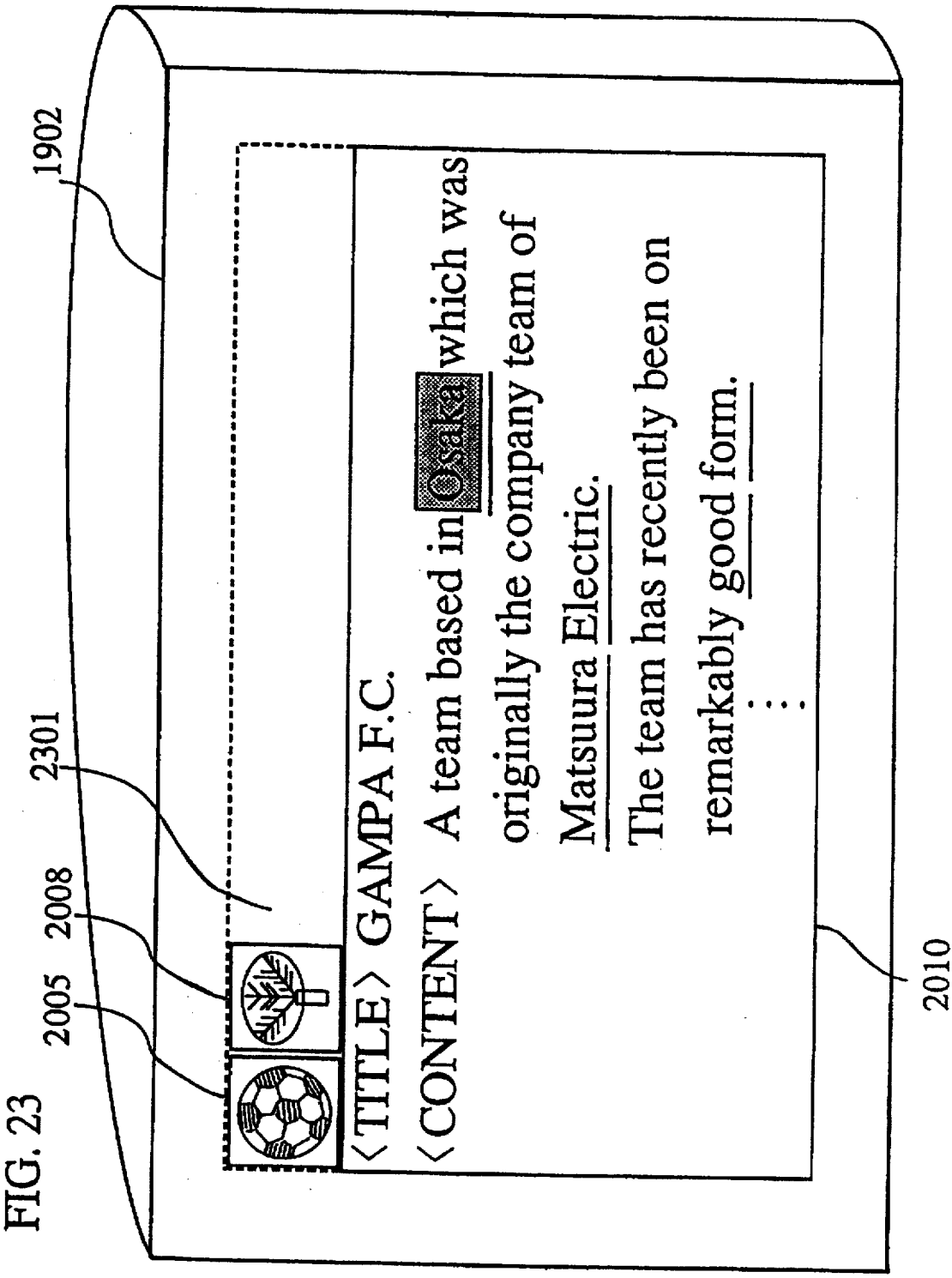
FIG. 23 is an example display of the data display unit in the fifth embodiment.

Here, when data display unit 1902 is displaying "Title-Yesterday's Soccer Results" as shown in FIG. 21, if the user presses "Down" key 2203 on remote controller 2201, highlight 2201 moves to link text "Gampa". If the user then presses "Select" key 2204 on remote controller 2201, data display unit 1902 will display "Title-Gampa F.C." as shown in FIG. 23. This is to say, by means of data display control unit 1904, data 2010 of design-appended data 2002 which is linked to the link text "Gampa" in design-appended data 2001 stored in data managing unit 1901 is displayed by data display unit 1902, while the designs written into design generation buffer 1908 are displayed by design display control unit 1906 in design display region 2301 which is at the top of data 2010. Designs 2005, 2008 displayed in design display region 2301 show the display history leading up to the current display of "Gampa F.C.".

Figure 24:
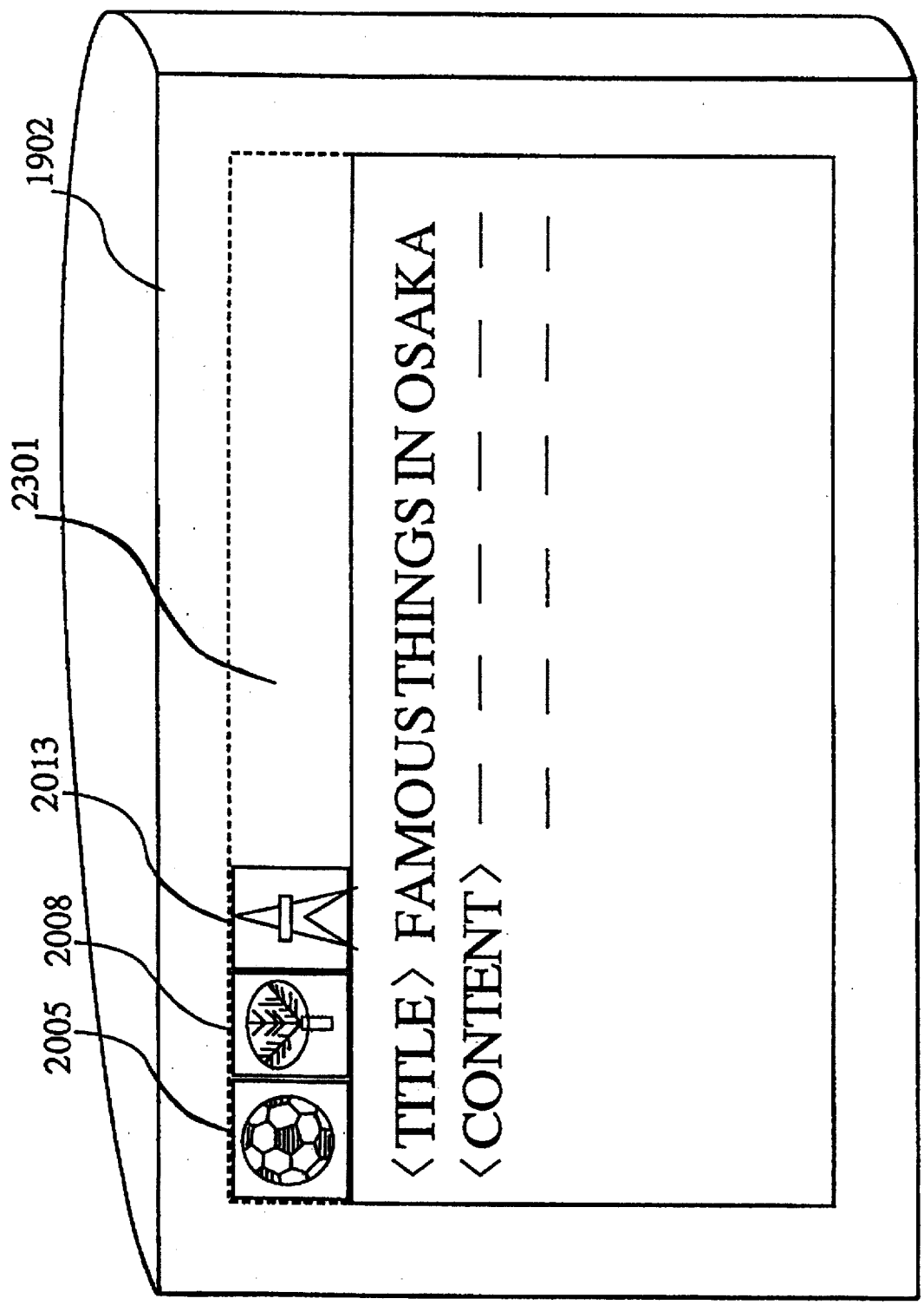
FIG. 24 is an example display of the data display unit in the fifth embodiment.

Next, if the user presses "Select" key 2204 on remote controller 2201 again, the link text "Osaka" is selected and the content of the data in design-appended data 2004 is displayed by display unit 1902 as shown in FIG. 24. At this point, designs 2005, 2008 and 2013, which suggest the content of the selection history of "Yesterday's Soccer Results", "Gampa F.C." and "Famous Things in Osaka" leading up to the current display of "Famous Things in Osaka", are displayed in order in the design display region 2301 on data display unit 1902.

Figure 25:
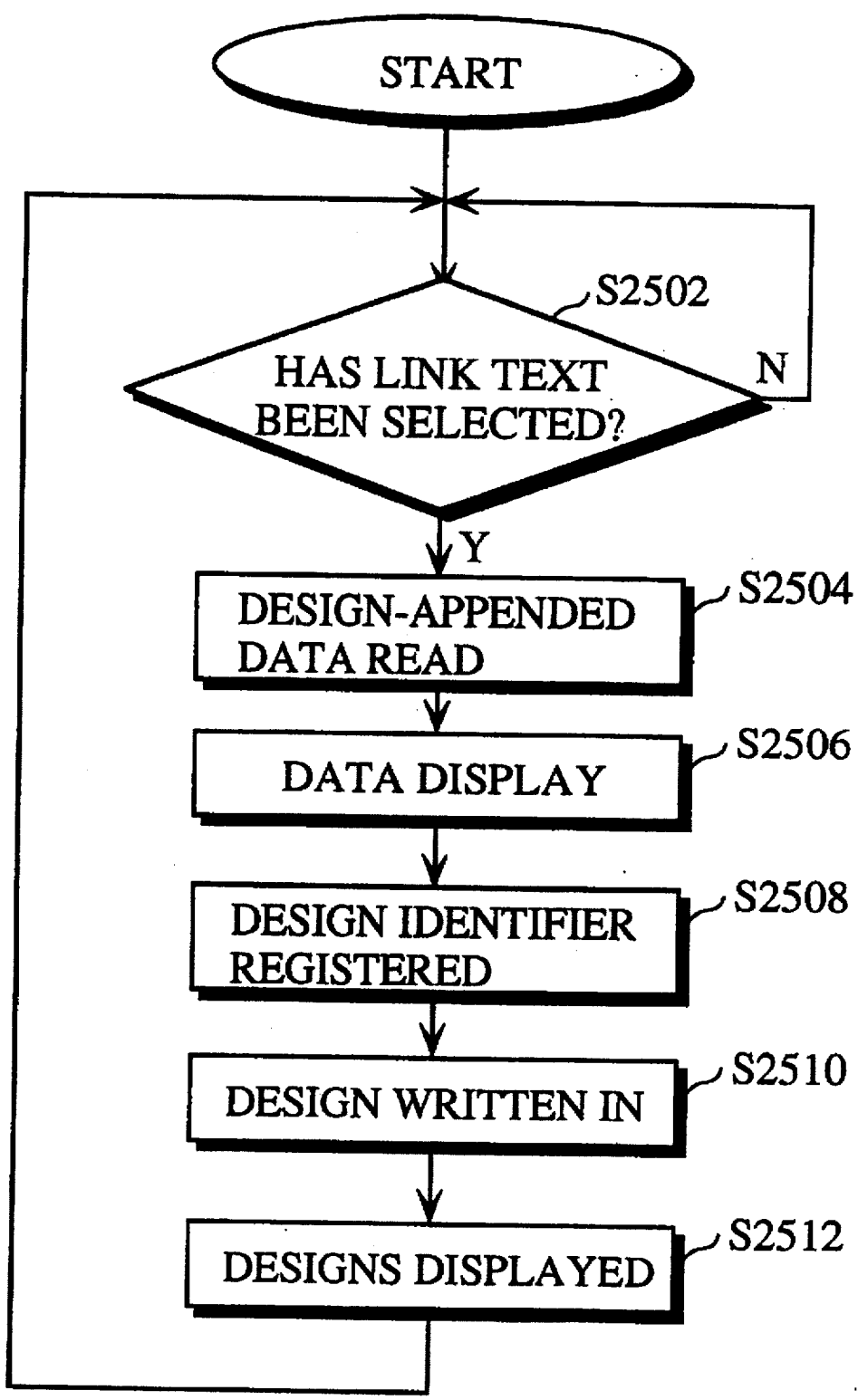
FIG. 25 is a flowchart for explaining the operation in the fifth embodiment.
Figure 26:
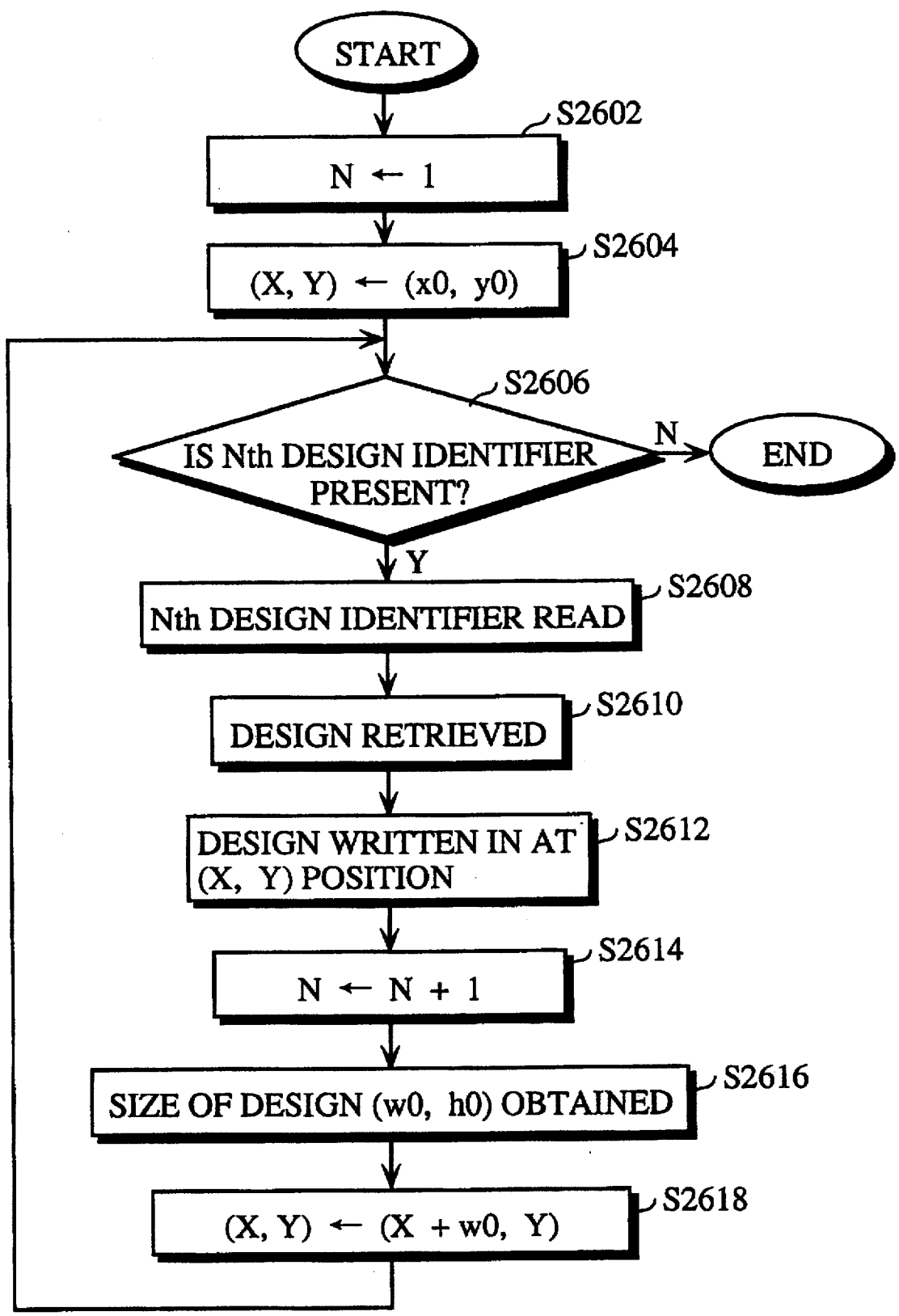
FIG. 26 is a flowchart for explaining the details of the operation in step S2510 in FIG. 25.

The following is an explanation of the operation for switching between displays of design-appended data in the present embodiment, with reference to the flowcharts in FIGS. 25 and 26. Note that these flowcharts assume that due to a specific operation, such as an input of an identifier of a piece of design-appended data, one piece of design-appended data is already being displayed by data display unit 1902.

Data display control unit 1904 waits for a selection notification for link text from the selection operation unit (S2502) and, on receiving such notification, reads the linked design-appended data which is linked to the link text from data managing unit 1901 (S2504). Data display control unit 1904 then has the data in the design-appended data read from data managing unit 1901 displayed by data display unit 1902 (S2506).

Next, data display control unit 1904 adds the design identifier in the design-appended data read from data managing unit 1901 to the designs stored in design identifier storage unit 1907 (S2508). Design generation unit 1905 reads the design in the design-appended data read by data display control unit 1904 and writes a new design which includes this read design into design generation buffer 1908 (S2510). The details of this operation are described later in the text.

Design display control unit 1906 has the designs written into design generation buffer 1908 displayed by data display unit 1902 (S2512) and a return to S2502 is performed.

It should be noted that while the processing is not shown as being terminated, it can be terminated when an instruction including a processing termination indication is sent from outside the system.

The following is a detailed explanation of the operation writing designs into design generation buffer 1908 in S2510, with reference to FIG. 26.

First, design generation unit 1905 sets the value of counter N so that N=1 (S2602). Next, predetermined initial arrangement values (x0, y0) are substituted into the arrangement position variables (X,Y) of the design (S2604). It is then judged whether the Nth design identifier is registered in the design identifier storage unit 1907 (S2606), with the process advancing to S2608 when it is registered or to S2612 when it is not registered.

In S2608, design generation unit 1905 reads the Nth design identifier from design identifier storage unit 1907. The design signified by this read design identifier is then retrieved from data managing unit 1901 (S2610) and is written into a position in design generation buffer 1908 shown by the arrangement position variables (X,Y) (S2612). The counter N is then incremented by "1" (S2614), the size of the retrieved design (w0,h0) is obtained (S2616), the values (X+w0,Y) are substituted into the arrangement position variables (X,Y) for the designs (S2618) and a return to S2606 is performed.

By means of the above embodiment, a user of a menu display device which switches between displays of data composed of Hypertext can find out what data was previously displayed by merely glancing at design display region 2301 of data display device 1902.

It should be noted here that while the group of designs for identifying the previously displayed data was described as being displayed listed horizontally, it is also possible for such designs to be listed vertically by substituting (X, Y+h0) into the arrangement position variables (X,Y), with various arrangements and display methods being possible.

Accordingly, when there are a large number of designs to be displayed which will not fit onto the screen, it is possible for the designs to be overlapped, or for only the most recent M designs to be displayed.

Also, the designs displayed in design display region 2301 of data display unit 1902 were described as indicating the pieces of design-appended data which were shown previously, although it is also possible to enable the system to allow selection of these designs using remote controller 2201. When a design is selected, data display control unit 1904 may be set so as to switch the display to the design-appended data which includes the selected design.

This is to say, the user may use "Left" key 2205, "Right" key 2206 and "Select" key 2204 of remote controller 2206 to select any of designs 2005, 2008 and 2013 which are displayed in design display region 2301 of data display unit 1902. On receiving notification of such a selection, data display control unit 1904 determines which of the designs in design generation buffer 1908 of design generation unit 1905 has been selected from its arrangement position, before reading the corresponding design identifier from design identifier storage unit 1907. It should be noted here that in the same way as in this embodiment, data display control device 1904 gives an indication to design display device 1906 to highlight design 2005 when making a selection of a design such as design 2005. Design display control unit 1906 then places a highlight on one of the designs displayed in design display region 2301.

As one example, after an operation of remote controller 2201 to highlight design 2008 shown in FIG. 24, data 2010 shown in FIG. 23 is displayed by data display unit 1902, with design display region 2301 changing according to control by design display control unit 1906 so that another design 2008 is displayed on the right of design 2013 in the design display region 2301 of FIG. 24.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A menu display device with a function for indicating a menu item in a menu displayed on a display screen and for displaying a next menu on a display screen in order to select an operation content, the menu display device comprising:

storage means for storing a plurality of menus, wherein each menu includes at least one menu item and a design for identifying a menu item, wherein there are connections between menu items so as to form a linked structure of the menus and wherein the storage means additionally stores the linked structure and a design for each menu item;

selection operation means for receiving a selection of a menu item which is made by moving a pointer on the display screen;

menu item display control means for retrieving a next menu which is related to the selected menu item and for having the retrieved menu displayed by the display screen;

marker design generation means for generating a new design which includes at least part of a design read from the storage means for a menu item in a previous menu which is related to the menu item displayed by the display screen; and marker design display control means for having the new design generated by the marker design generation means displayed by the display screen as the pointer for the selection operation means.

2. The menu display device of claim 1, wherein each design stored by the storage means suggests a content of a corresponding menu item.

3. The menu display device of claim 2, wherein the marker design generation means includes:

judging unit for judging whether there are a plurality of related menu items whose selection causes the menu item presently being displayed by the display screen to be displayed; and combined marker design generation unit for generating, when the judging unit judges that there are a plurality of related menu items, a new design which includes at least part of each design of the related menu items.

4. The menu display device of claim 1, wherein the marker design generation means includes:

judging unit for judging whether there are a plurality of related menu items whose selection causes the menu item presently being displayed by the display screen to be displayed; and combined marker design generation unit for generating, when the judging unit judges that there are a plurality of related menu items, a new design which includes at least part of each design of the related menu items.

5. A menu display device which displays on a display means a menu including at least one menu item which has a linked structure and which is used for selecting an operation, the menu display device comprising:

selection operation means for receiving a selection of a menu item which is made by moving a pointer on the display means;

menu item storage means for storing designs which enable each menu item to be distinguished from each other and which suggest a content of a corresponding menu item and auxiliary designs which resemble said designs and which are used for facilitating generation of the pointer;

menu item display control means for retrieving from the menu item storage means menu items in a next menu which are related to the menu item for which the selection was received and for having the retrieved menu items displayed by the display means;

auxiliary marker design generation means for generating a new design which includes at least part of an auxiliary design stored in the menu item storage means; and marker design display control means for having the new design generated by the auxiliary marker design generation means displayed by the display means as the pointer for the selection operation means.

6. The menu display device of claim 5, wherein the marker design generation means includes:

judging unit for judging whether there are a plurality of related menu items whose selection causes the menu item presently being displayed by the display means to be displayed; and combined auxiliary marker design generation unit for generating a new design which includes at least part of each auxiliary design for the related menu items on the next higher level, when the judging unit judges that there are a plurality of related menu items.

7. A menu display device for a data display system which successively displays data which include link text that is related to other data on a display screen, the menu display device comprising:

data storage means for storing a plurality of data, each of which includes a design which is identified by a design identifier and which suggests the content of the data, and links between link text included in each piece of data and other data;

selection operation means for selecting link text in data displayed on the display screen;

data display control means for displaying a selection operation means for selecting link text in data displayed on the display screen, for reading data related to link text selected by the selection operation means and for having the read data displayed by the display screen;

design identifier storage means for successively storing a design identifier of a design included in each data displayed by the data display control means, each time new data is displayed on the display screen; and design display control means for retrieving, from the data storage means, designs which correspond to each design identifier stored in the design identifier storage means, and for displaying, in a different display region of the display screen to a data display region, the retrieved designs in an order in which each data to which the designs correspond was displayed.

8. The menu display device of claim 7, further comprising design selection reception means for receiving a selection of a design out of a plurality of designs displayed on the display screen, wherein the data display control means includes a history data display control unit for retrieving data which includes the design whose selection is received by the design selection reception means and for having the retrieved data displayed on the display screen.

9. A menu display device for indicating a menu item in a menu displayed on a display screen and for displaying a subsequent related menu on a display screen in order to select an operation content, the menu display device comprising:

storage means for storing a plurality of menus, wherein each menu includes at least one menu item and a graphic design symbol for identifying a menu item, wherein there are link connections between menu items so as to form a linked structure of the menus and wherein the storage means additionally stores the linked structure and a graphic design symbol for each menu item;

selection operation means for receiving a selection of a menu item which is made by moving a cursor on the display screen adjacent a menu item and selecting that menu item;

menu item display control means for retrieving a subsequent menu which is related by the link connection to the selected menu item from a previous menu and for having the retrieved menu displayed by the display screen;

cursor design generation means for generating a graphic design symbol to represent the cursor position on the display screen, which includes at least a portion of the graphic design symbol read from the storage means for the related menu item in the previous menu which is related to the menu item displayed by the display screen; and marker design display control means for having the new graphic design symbol generated by the cursor design generation means displayed by the display screen as a cursor for the selection operation means for the subsequent menu, whereby the appearance of the cursor indicates a path through the linked structure of the menu.

10. A menu display device for indicating a relationship between a series of linked menu items listed in separate menus and displayed sequentially on a display screen when selected by a cursor comprising:

means for storing a plurality of data representing menus, each menu including a plurality of separate menu items of indicia;

means for identifying a plurality of items of indicia with a plurality of respective graphic symbols for each menu;

means for linking a menu item of a first menu from the plurality of menus having a graphic symbol with a second menu from the plurality of menus;

selection means for displaying the second menu when a linked menu item has been selected on the first menu; and means for generating a change in a displayed appearance of the cursor used to select an item on the first menu to at least a recognizable portion of the graphic symbol selected from the first menu when the second menu is displayed, thereby indicating by the appearance of the cursor a path through the linked menus.

11. The menu display device of claim 10, wherein the means for generating includes:

judging unit for judging whether there are a plurality of related menu items whose selection causes the menu items presently being displayed by the display screen to be displayed; and combined marker design generation unit for generating, when the judging unit judges that there are a plurality of related menu items, a new cursor design, which includes at least part of each graphic design symbol of the related menu items.

12. A process of navigating through a hierarchy of a structure of menus having menu items that are identified by graphic symbols, the menus being linked through selection of a menu item by a cursor position, comprising the steps of:

displaying a menu with a plurality of menu items identified by respective graphic symbols;

enabling the selection of a specific graphic symbol on the displayed menu by the user with a cursor position of a first graphic configuration;

providing a visual feedback to the user by dynamically generating new graphical designs for the menu items of a next-lower level menu in response to the selection of the specific graphic symbol of the preceding menu; and generating a second graphic configuration of a cursor position that includes a recognizable portion of the graphic symbol of the selected menu item in the preceding menu whereby the appearance of the cursor provides the user with an indication of the path through the hierarchy structure of the linked menus.

* * * * *